United States Patent
Hunt et al.

(10) Patent No.: US 10,275,154 B2
(45) Date of Patent: Apr. 30, 2019

(54) BUILDING MEMORY LAYOUTS IN SOFTWARE PROGRAMS

(71) Applicant: Oracle International Corporation, Redwood City, CA (US)

(72) Inventors: Charles J. Hunt, Libertyville, IL (US); Steven J. Drach, San Francisco, CA (US); Jean-Francois Denise, Biviers (FR)

(73) Assignee: ORACLE INTERNATIONAL CORPORATION, Redwood City, CA (US)

( * ) Notice: Subject to any disclaimer, the term of this patent is extended or adjusted under 35 U.S.C. 154(b) by 551 days.

(21) Appl. No.: 14/533,966

(22) Filed: Nov. 5, 2014

(65) Prior Publication Data
US 2016/0124646 A1  May 5, 2016

(51) Int. Cl.
*G06F 9/44* (2018.01)
*G06F 3/06* (2006.01)
*G06F 9/50* (2006.01)

(52) U.S. Cl.
CPC .......... *G06F 3/0604* (2013.01); *G06F 3/0629* (2013.01); *G06F 3/0644* (2013.01); *G06F 3/0673* (2013.01); *G06F 9/50* (2013.01)

(58) Field of Classification Search
CPC ....... G06F 12/023; G06F 3/067; G06F 9/5016
USPC ....................................................... 711/170
See application file for complete search history.

(56) References Cited

U.S. PATENT DOCUMENTS

| | | | |
|---|---|---|---|
| 4,493,027 A | 8/1985 | Katz | |
| 5,590,327 A * | 12/1996 | Biliris | G06F 9/4435 718/100 |
| 5,784,699 A | 7/1998 | McMahon | |
| 6,343,341 B1 | 1/2002 | Cabrera | |
| 6,609,158 B1 | 8/2003 | Nevarez | |
| 6,804,682 B1 | 10/2004 | Kemper et al. | |
| 7,370,318 B1 | 5/2008 | Howe et al. | |
| 7,426,723 B1 * | 9/2008 | Nikolov | G06F 8/52 717/116 |
| 7,451,439 B2 | 11/2008 | Nickell et al. | |
| 8,418,141 B2 | 4/2013 | Baeumer et al. | |
| 8,468,500 B2 | 6/2013 | Hatabu | |

(Continued)

OTHER PUBLICATIONS

Sartor et al., "No Bit Left Behind: The Limits of Heap Data Compression", Jun. 2008, Dept. of Computer Sciences, University of Texas at Austin, Technical Report TR-08-17, 15 pages.*

(Continued)

*Primary Examiner* — Bing Zhao
*Assistant Examiner* — Hui-Wen Lin
(74) *Attorney, Agent, or Firm* — Tarolli, Sundheim, Covell & Tummino LLP

(57) ABSTRACT

The disclosed embodiments provide a system that facilitates the execution of a software program. During operation, the system obtains a set of artifacts associated with executing a software program. Next, the system uses the set of artifacts to determine an inheritance hierarchy associated with an artifact from the set of artifacts. The system then uses the inheritance hierarchy and the set of artifacts to generate a memory layout of an object instance represented by the artifact, wherein the memory layout includes a set of fields associated with a set of levels of the inheritance hierarchy.

22 Claims, 14 Drawing Sheets
(2 of 14 Drawing Sheet(s) Filed in Color)

(56) References Cited

U.S. PATENT DOCUMENTS

| | | |
|---|---|---|
| 8,539,455 B2 | 9/2013 | Berg et al. |
| 8,726,226 B2 | 5/2014 | Groves |
| 8,726,238 B2 | 5/2014 | Duesterwalk et al. |
| 8,780,114 B1 * | 7/2014 | Jackey .................. G06F 11/323 345/440 |
| 8,799,693 B2 | 8/2014 | Vick |
| 9,471,482 B2 | 10/2016 | Magdon-Ismail et al. |
| 2002/0052727 A1 | 5/2002 | Bond |
| 2003/0037173 A1 | 2/2003 | Pace |
| 2004/0122861 A1 | 6/2004 | Hulse |
| 2005/0055500 A1 | 3/2005 | Park |
| 2005/0246378 A1 | 11/2005 | Hunt |
| 2006/0020689 A1 | 1/2006 | Roman |
| 2006/0129997 A1 | 6/2006 | Stichnoth |
| 2007/0006150 A9 | 1/2007 | Walmsley |
| 2007/0079306 A1 | 4/2007 | Qumei |
| 2007/0094641 A1 | 4/2007 | Darr |
| 2007/0220504 A1 | 9/2007 | Eker |
| 2008/0005208 A1 | 1/2008 | Vaswani |
| 2008/0024453 A1 | 1/2008 | Webb et al. |
| 2008/0216064 A1 | 9/2008 | Braswell |
| 2009/0083263 A1 | 3/2009 | Felch |
| 2009/0132995 A1 | 5/2009 | Iborra |
| 2010/0257511 A1 | 10/2010 | Hatabu |
| 2010/0313179 A1 | 12/2010 | Groves |
| 2011/0276610 A1 | 11/2011 | Hossain et al. |
| 2013/0014275 A1 | 1/2013 | Goodes |
| 2013/0067585 A1 | 3/2013 | Sterland |
| 2013/0073883 A1 | 3/2013 | Vick |
| 2013/0103893 A1 | 4/2013 | Lee |
| 2013/0219379 A1 | 8/2013 | Brauneis |
| 2013/0311806 A1 | 11/2013 | Felch |
| 2014/0063027 A1 | 3/2014 | Becker |
| 2014/0068235 A1 | 3/2014 | Nightingale et al. |
| 2014/0143372 A1 | 5/2014 | Nahrgang |
| 2015/0186293 A1 | 7/2015 | Lin |
| 2016/0004858 A1 | 1/2016 | Chen |
| 2016/0100001 A1 | 4/2016 | Sirota |
| 2016/0124645 A1 | 5/2016 | Denise et al. |
| 2016/0124646 A1 | 5/2016 | Hunt |
| 2016/0124718 A1 | 5/2016 | Denise et al. |
| 2016/0124725 A1 | 5/2016 | Drach et al. |
| 2016/0239212 A1 | 8/2016 | Solihin et al. |

OTHER PUBLICATIONS

OPENJDK "Code Tools: jol" downloaded from http://openjdk.java.net/projects/code-tools/jol on Dec. 29, 2016.

Sartor, J. et al.; "No Bit Left Behind: The Limits of Heap Data Compression", University of Texas at Austin [online], 2008 [retreived Mar. 20, 2016], retrieved from Internet, <URL: http/hirzels.com/martin/papers/ismm08-limits-compression-TR.pdf>, pp. 1-15.

Hofer, P.; "Enhanced Heap Visulation with GCspy", Johannes Kepler University Linz [online], 2011 [retrieved Mar. 20, 2016], retrieved from the Internet: <URL: http://sswjku.at/General/Staff/TS/enhanced_heap_visualization_with_gcspy.pdf>, whole document.

Mono; "Generational GC | Mono", downloaded from http://www.mono-project.com/docs/advanced/garbage-collector/sgen/ on Jan. 18, 2017.

Che, S. et al., "Dymaxion: Optimizing Memory Access Patterns for Heterogeneous Systems", pp. 1-11. (Year: 2011).

Peluso, S. et al., "Application Transparent Migration of Simulation Objects with Generic Memory Layout", pp. 1-9. (Year: 2011).

Cho, D. et al., "Adaptive Scratch Pad Memory Management for Dynamic Behavior of Multimedia Applications", pp. 554-567. (Year: 2009).

Che, S. et al. "Dymaxion++: A Directive-based API to Optimize Data Layout and Memory Mapping for Heterogeneous Systems", pp. 916-924. (Year: 2014).

Cho, D. et al., "Software Controlled Memory Layout Reorganization for Irregular Array Access Patterns", pp. 179-188. (Year: 2007).

Kandemir, M. et al., "Compiler-Directed Selection of Dynamic Memory Layouts", pp. 219-224. (Year: 2001).

* cited by examiner

| Size | Padding | Class |
|---|---|---|
| 376 | 257 | com.my.bigclass |
| 80 | 10 | com.my.bigclass2 |
| 72 | 7 | com.my.super2 |
| 56 | 8 | com.my.super1 |
| 48 | 4 | com.my.class3 |
| 48 | 6 | com.my.class2 |
| 40 | 6 | com.my.class |

FIG. 4C

Classes that could benefit from boolean refactoring

| Gain | Class |
|---|---|
| 24 | com.my.class4 |
| 16 | com.my.class2 |
| 8 | com.my.class |
| 8 | com.my.class3 |

FIG. 4D

BUILDING MEMORY LAYOUTS IN SOFTWARE PROGRAMS

RELATED APPLICATION

The subject matter of this application is related to the subject matter in a co-pending non-provisional application by the same inventors as the instant application and filed on the same day as the instant application entitled "Visualizations of Memory Layouts in Software Programs," having Ser. No. 14/533,948, filed on 5 Nov. 2014, which issued as U.S. Pat. No. 9,910,591 on 6 Mar. 2018.

The subject matter of this application is also related to the subject matter in a co-pending non-provisional application by the same inventors as the instant application and filed on the same day as the instant application entitled "Context-Based Generation of Memory Layouts in Software Programs," having Ser. No. 14/533,955, filed on 5 Nov. 2014, which issued as U.S. Pat. No. 9,552,192 on 24 Jan. 2017.

The subject matter of this application is also related to the subject matter in a co-pending non-provisional application by the same inventors as the instant application and filed on the same day as the instant application entitled "Identifying Improvements to Memory Usage of Software Programs," having Ser. No. 14/533,976, and filed on 5 Nov. 2014.

BACKGROUND

Field

The disclosed embodiments relate to techniques for improving memory usage in software programs. More specifically, the disclosed embodiments relate to techniques for building memory layouts in software programs.

Related Art

Developers of software programs are typically unaware of how data structures and/or objects in the software programs are laid out in memory. As a result, the developers may create objects and/or data structures that result in suboptimal execution and/or memory consumption of the software programs. For example, a developer may declare fields in a software program without considering the alignment requirements of the fields, resulting in a greater amount of padding in the software program than if the fields were declared in a different order and/or using different types. Because the padding represents memory that does not contain useful data, the padding may unnecessarily increase the memory consumption of the software program and reduce the cache utilization of a processor on which the software program executes.

Consequently, the development and execution of software programs may be facilitated by mechanisms for improving the knowledge and management of memory consumption in the software programs.

SUMMARY

The disclosed embodiments provide a system that facilitates the execution of a software program. During operation, the system obtains a set of artifacts associated with executing a software program. Next, the system uses the set of artifacts to determine an inheritance hierarchy associated with an artifact from the set of artifacts. The system then uses the inheritance hierarchy and the set of artifacts to generate a memory layout of an object instance represented by the artifact, wherein the memory layout includes a set of fields associated with a set of levels of the inheritance hierarchy.

In some embodiments, the system also uses the set of artifacts to determine additional inheritance hierarchies associated with one or more additional artifacts from the set of artifacts. Next, the system uses the additional inheritance hierarchies and the set of artifacts to generate additional memory layouts of one or more object instances represented by the one or more additional artifacts.

In some embodiments, the system also uses the set of artifacts to determine one or more metrics associated with the memory layout.

In some embodiments, the one or more metrics include a number of references to the object instance, an overall memory usage associated with the object instance, or a potential memory savings associated with the object instance.

In some embodiments, using the set of artifacts to determine the inheritance hierarchy associated with the artifact includes identifying the inheritance hierarchy from a set of superclass declarations in the artifact and one or more additional artifacts associated with the inheritance hierarchy from the set of artifacts.

In some embodiments, using the inheritance hierarchy and the set of artifacts to generate the memory layout of the object instance includes:
  (i) obtaining a set of field declarations from the artifact and the one or more additional artifacts;
  (ii) using the set of field declarations to generate a logical representation of the object instance; and
  (iii) providing the logical representation to a virtual machine instance, wherein the logical representation is used by the virtual machine instance to generate the memory layout.

In some embodiments, using the inheritance hierarchy and the set of artifacts to generate the memory layout of the object instance further includes obtaining metadata related to the memory layout from the artifact and the one or more additional artifacts, and including the metadata in the logical representation of the object instance.

In some embodiments, the set of artifacts includes a compiled class.

In some embodiments, the set of artifacts is obtained as a package or a directory.

BRIEF DESCRIPTION OF THE FIGURES

The patent or application file contains at least one drawing executed in color. Copies of this patent or patent application publication with color drawing(s) will be provided by the Office upon request and payment of the necessary fee.

FIG. 4C shows an exemplary screenshot in accordance with the disclosed embodiments.

FIG. 4D shows an exemplary screenshot in accordance with the disclosed embodiments.

In the figures, like reference numerals refer to the same figure elements.

DETAILED DESCRIPTION

Figure 1:
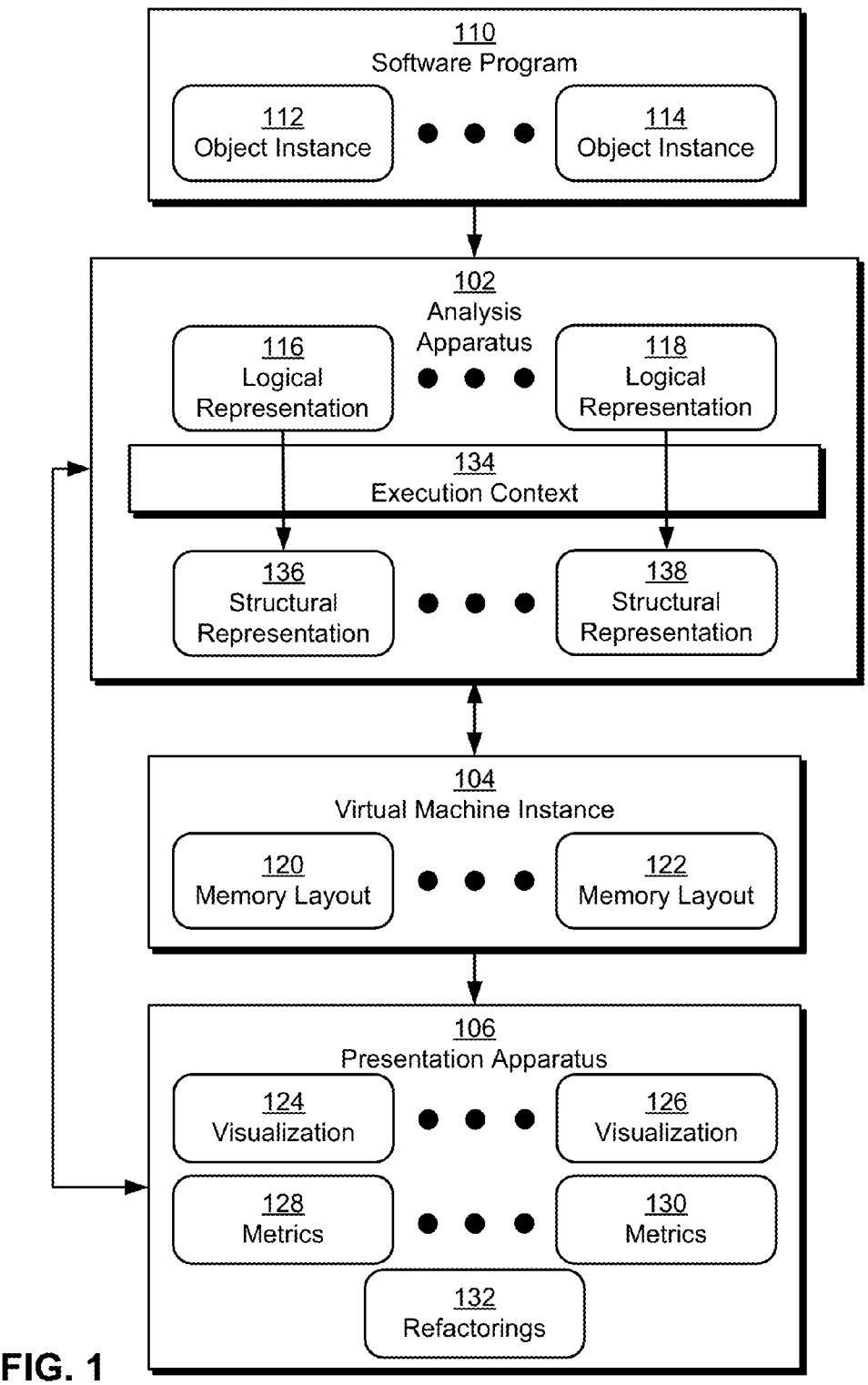
FIG. 1 shows a schematic of a system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments provide a method and system for facilitating the execution of a software program. During development of the software program, source code for the software program may be created using a programming language. The source code may then be compiled into an executable form to enable the execution of the software program.

More specifically, the disclosed embodiments provide a method and system for improving memory usage in the software program. First, the disclosed embodiments provide functionality to generate memory layouts for object instances in the software program. Because the layout of the software program in memory may depend on the environment in which the software program is executed, the memory layouts may be generated by determining the structure of the software program and applying a given execution context from a set of possible execution contexts for the software program to the determined structure.

For example, the structure of the software program may be determined by creating a set of logical representations of the object instances from class descriptions, compiled classes, and/or memory dumps associated with the software program. Next, the logical representations may be converted into structural representations that contain standard binary versions of components in the object instances. A virtual machine instance may be configured to operate within the execution context, and the structural representations may be provided to the virtual machine instance for generation of the memory layouts from the structural representations. Memory layouts may be generated for other execution contexts by configuring additional virtual machine instances to operate within the other execution contexts, providing the structural representations to the other virtual machine instances, and obtaining the memory layouts from the other virtual machine instances. Because the execution context used to generate the memory layouts is decoupled from the local execution context of the computer system used to generate the memory layouts, memory layouts may be generated for a variety of execution contexts without requiring recompiling or reloading of the software program and/or using different local execution contexts (e.g., computer hardware and/or platforms) to generate the memory layouts.

In addition, the logical representations, structural representations, and/or memory layouts may be generated from a set of artifacts associated with executing the software program, such as compiled classes and/or other executable binaries. The set of artifacts may be included in a package, directory, and/or other type of aggregation or collection. The set of artifacts may be used to determine an inheritance hierarchy associated with each artifact. The inheritance hierarchy and set of artifacts may then be used to generate a logical representation of an object instance represented by the artifact, which in turn may be used to generate the memory layout of the object instance.

Once the memory layouts are created, visualizations of the memory layouts may be provided to facilitate understanding of the memory layouts by a user, such as a developer of the software program. Each visualization may include graphical representations of fields and/or other components of the object instances as overlays on a grid, with each rectangle in the grid representing a unit of memory (e.g., one byte). As a result, the position and amount of space occupied by a graphical representation may indicate the offset and allocated size of the corresponding component.

The visualization may also include a graphical distinction between memory space occupied by data in the object instance and memory space occupied by padding in the object instance, as well as a separate graphical distinction among fields associated with different levels of the object instance's inheritance hierarchy. For example, data and padding may be depicted with different levels of transparency, while fields may be color-coded according to the levels of the inheritance hierarchy to which the fields belong.

The structure and/or memory layouts may additionally be used to identify and/or suggest refactorings of object instances that reduce use of memory space in the object instances. First, the structure may be analyzed to identify portions of the object instances that are determined to inefficiently use memory space. For example, the logical representations may be examined to identify use of multiple Booleans or boxed primitives, fields associated with multiple levels in the inheritance hierarchy, and/or other patterns that may lead to inefficient use of memory in the object instances.

To verify that a portion of an object instance uses memory space inefficiently, the memory layout of the object instance in a given execution context may be compared to a refactored memory layout of the object instance, which is generated by applying the same execution context to a refactored structure of the object instance. The refactored structure may replace a portion of the object instance that is associated with inefficient use of memory space with a refactoring that is not associated with inefficient use of memory space. If the refactored memory layout consumes less memory than the original memory layout, the refactoring associated with the refactored memory layout may be provided to improve the memory consumption of the object instance. A potential memory savings associated with the refactoring may also be calculated and provided to further facilitate improved memory usage in the software program. Finally, a graphical distinction between the portion and the remainder of the object instance's memory space may be included in the visualization of the object instance.

FIG. 1 shows a schematic of a system in accordance with the disclosed embodiments. The system may be used to facilitate the development and execution of a software program 110. Software program 110 may be a standalone application, operating system, enterprise application, database, library, device driver, and/or other type of software. In addition, software program 110 may be executed in a variety of environments. For example, software program 110 may be executed on a single desktop computer or workstation, or software program 110 may be distributed across multiple servers within a data center. Along the same lines, software program 110 may be executed sequentially or in parallel on one or more processors and/or processor cores.

Software program 110 may also execute independently of the platform of the computer system on which software program 110 executes. For example, a virtual machine (e.g., virtual machine instance 104) such as a Java™ (Java™ is a registered trademark of Oracle America, Inc.) Virtual Machine (JVM) may be used to execute software program 110 on the computer system regardless of the operating system, drivers, and/or hardware on the computer system.

More specifically, the system of FIG. 1 may include functionality to improve memory usage by object instances 112-114 in software program 110. Each object instance 112-114 may be an instance of a class and/or other template for creating objects in software program 110. As shown in FIG. 1, the system includes an analysis apparatus 102 and a presentation apparatus 106. Each of these components is described in further detail below.

Analysis apparatus 102 may determine a structure of software program 110, as well as an execution context 134 for software program 110. The structure may include a set of logical representations 116-118 of object instances 112-114 and a set of structural representations 136-138 generated from logical representations 116-118. Logical representations 116-118 may be created from class descriptions of classes in software program 110, compiled classes, a memory dump of software program 110, and/or other structured representations of classes and/or object instances 112-114 in software program 110. Each logical representation may specify a set of fields in the corresponding object instance, the parent class of the object instance, and/or metadata related to the layout of the fields in memory. For example, a logical representation of a Java™ class may include a set of strings that includes the class name of the Java™ class, the name of the Java™ class's super class, a Contended Annotation group name, and/or a set of tuples describing fields (e.g., field name, data type, Contended Annotation group name) in the class.

In one or more embodiments, logical representations 116-118 are created from a set of artifacts associated with executing software program 110. Each artifact may include compiled and/or executable code for software program 110. For example, each artifact may be a compiled class in software program 110. The set of artifacts may be obtained as a package, directory, and/or other aggregation or collection. For example, a user such as a developer of software program 110 may provide a class path containing one or more directories and/or Java™ packages from which the set of artifacts may be obtained. Analysis apparatus 102 may obtain a set of Java™ class files from the directories and/or packages and create a logical representation from each class file. Creation of logical representations of object instances from sets of artifacts is described in further detail below with respect to FIG. 2.

Execution context 134 may represent a software and/or hardware environment in which software program 110 may be executed. For example, execution context 134 may include a platform, architecture, and/or one or more configuration options for executing software program 110 within a virtual machine such as a JVM. The platform may include the platform of the execution environment of software program 110, such as a Java™ Development Kit (JDK) platform. The architecture may specify the hardware architecture of the computer system on which software program 110 may execute, such as a 32-bit architecture and/or 64-bit architecture. The configuration options may affect the operation of the execution environment and the layout of software program 110 in memory. As a result, the configuration options may include options for compressing object references, enabling or disabling field isolation (e.g., through Java™ @Contended annotations), padding widths associated with field isolation, and/or layout styles or groupings of fields in object instances 112-114.

Execution context 134 may be a local execution context, which may be a native execution contest of a computer system on which analysis apparatus 102 runs. Alternatively, execution context 134 may be a non-local execution context that differs in hardware and/or software configuration from that of the local execution context. For example, a user may provide the platform, architecture, and/or configuration options associated with a non-local execution context 134 using a command entered in a command-line interface (CLI) and/or one or more parameters entered through a graphical user interface (GUI). Alternatively, analysis apparatus 102 may be configured to obtain execution context 134 as the local execution context and/or an execution context found in a memory dump of software program 110.

Logical representations 116-118 may be converted into structural representations 136-138 using execution context 134. Each structural representation may be a binary and/or other physical representation of the corresponding object instance. For example, a structural representation of a Java™ class may include standardized Java™ byte code that represents the components listed in the corresponding logical representation. A JVM instance (e.g., virtual machine instance 104) may be used to convert the logical representation into a Java™ binary class that is used to size the corresponding object instance. In other words, structural representations 136-138 may include information that can be used to determine the layout of the corresponding object instances 112-114 in memory.

After the structure of software program 110 and execution context 134 are determined, analysis apparatus 102 may use the structure and execution context 134 to generate memory layouts 120-122 for object instances 112-114 in software program 110. In particular, analysis apparatus 102 may apply execution context 134 to structural representations 136-138 independently of the local execution context of the computer system on which analysis apparatus 102 executes. To decouple creation of memory layouts 120-122 from the local execution context, analysis apparatus 102 may configure a virtual machine instance 104 to operate within execution context 134 and provide logical representations 116-118 to virtual machine instance 104. Virtual machine instance 104 may compute a memory layout (e.g., memory layouts 120-122) for each structural representation, and analysis apparatus 102 may obtain the memory layout from virtual machine instance 104.

For example, analysis apparatus 102 may instantiate a JVM instance as a remote process and include execution context 134 as one or more parameters during instantiation of the remote process. Once structural representations 136-138 are created, analysis apparatus 102 may send structural representations 136-138 to the remote process, and the remote process may compute each memory layout 120-122 by calculating offsets and allocated sizes of fields in the corresponding structural representations 136-138. Analysis apparatus 102 may then provide the computed memory layout via an asynchronous notification to analysis apparatus 102.

Alternatively, execution context 134 may be obtained as a local execution context from a local JVM used by analysis apparatus 102. As a result, analysis apparatus 102 may use the local JVM to calculate memory layouts 120-122 in lieu of instantiating a remote JVM with the same execution context as the local JVM and using the remote JVM to create memory layouts 120-122.

In another example, execution context 134 may be provided to an emulator that emulates the hardware and/or software used to execute software program 110. The emulator may generate memory layouts 120-122 by running software program 110 in a variety of emulated execution contexts (e.g., execution context 134) and/or applying the emulated execution contexts to structural representations 136-138.

The decoupling of execution context 134 from the local execution context may further allow memory layouts 120-122 to be created and compared across multiple execution contexts. For example, the user may provide an update to execution context 134 to enable the comparison of memory layouts 120-122 across two or more hardware architectures, including non-existent hardware architectures (e.g., a 96-bit architecture). Each time execution context 134 is updated or changed, analysis apparatus 102 may configure a new virtual machine instance 104 to operate within execution context 134 and terminate any previously running virtual machine instances. Analysis apparatus 102 may then use the newly created virtual machine instance to generate memory layouts 120-122 from structural representations 136-138. The application of an updated execution context by the newly created virtual machine instance may result in the creation of memory layouts 120-122 that differ from memory layouts 120-122 that were previously generated by older virtual machine instances that operated within older execution contexts.

After memory layouts 120-122 are generated, presentation apparatus 106 may display visualizations 124-126 of memory layouts 120-122. For example, presentation apparatus 106 may provide visualizations 124-126 within the same GUI used to obtain execution context 134 and/or the set of artifacts from which memory layouts 120-122 were generated. Each visualization may include a graphical representation of an object instance in memory. For example, the memory space of the object instance may be represented by a grid of rectangles, with each rectangle representing a unit of memory (e.g., one byte). Fields in the object instance may be represented by shaded, colored, and/or textured rectangles in the grid.

The visualization may also include a graphical distinction between memory space occupied by data in the object instance and memory space occupied by padding in the object instance, as well as a different graphical distinction between fields associated with different levels of the object instance's inheritance hierarchy. For example, padding and data in the memory space may have different levels of transparency, while fields in the memory space may be color-coded according to the classes in the inheritance hierarchy of the object instance to which the fields belong. Visualizations of memory layouts in software programs are discussed in further detail below with respect to FIGS. 4A-4D.

Analysis apparatus 102 and/or presentation apparatus 106 may also provide one or more metrics 128-130 associated with the memory layout of each object instance. For example, analysis apparatus 102 may calculate metrics 128-130 from the artifacts, logical representations 116-118, structural representations 136-138, and/or memory layouts 120-122 associated with object instances 112-114. The metrics may include the number of references to the object instance, the overall memory usage of the object instance, and/or a padding size of the object instance. Presentation apparatus 106 may display metrics 128-130 next to visualizations 124-126 to facilitate user understanding of the memory usage of object instances 112-114. Calculation of metrics associated with memory layouts of object instances is described in further detail below with respect to FIG. 2.

Analysis apparatus 102 and presentation apparatus 106 may further improve the memory usage of software program 110 by identifying portions of object instances 112-114 that inefficiently use memory space in software program 110. For example, analysis apparatus 102 may examine logical representations 116-118 to identify use of multiple Booleans or boxed primitives, multiple levels in the inheritance hierarchy, and/or other patterns that may lead to inefficient use of memory in object instances 112-114.

To verify that a portion of an object instance uses memory space inefficiently within a given execution context 134, analysis apparatus 102 may compare the memory layout of the object instance to a refactored memory layout of the object instance, which is generated by applying the same execution context 134 to a refactored structure of the object instance. The refactored structure may replace a portion of the object instance that is associated with inefficient use of memory space with a refactoring that is not associated with inefficient use of memory space. If the refactored memory layout consumes less memory than the original memory layout, presentation apparatus 106 may provide the refactoring to improve the memory consumption of the object instance. Analysis apparatus 102 may further calculate a potential memory savings associated with the refactoring, and presentation apparatus 106 may include the potential memory savings in the set of metrics associated with the object instance. Finally, presentation apparatus 106 may display a graphical distinction between the portion and the remainder of the object instance's memory space in the visualization of the object instance.

Those skilled in the art will appreciate that the system of FIG. 1 may be implemented in a variety of ways. First, analysis apparatus 102, virtual machine instance 104, and presentation apparatus 106 may be provided by a single physical machine, multiple computer systems, one or more virtual machines (e.g., JVMs), a grid, and/or a cloud computing system. For example, the same virtual machine instance (e.g., virtual machine instance 104) or different virtual machine instances may be used to generate structural representations 136-138 from logical representations 116-118 and memory layouts 120-122 from structural representations 136-138. In addition, analysis apparatus 102 and presentation apparatus 106 may be implemented together and/or separately by one or more hardware and/or software components and/or layers.

Second, analysis apparatus 102 and presentation apparatus 106 may be configured to provide memory layouts 120-122, visualizations 124-126, and/or metrics 128-130 for a variety of development and/or execution environments. As mentioned above, analysis apparatus 102 and virtual machine instance 104 may enable the generation of memory layouts 120-122 associated with a number of possible execution contexts, independently of the local execution context of the computer system on which analysis apparatus 102 runs. The execution contexts may also include non-virtualized execution contexts, such as native execution of software program 110 on a given platform, operating system, and/or set of hardware instead of a virtual machine. Along the same lines, analysis apparatus 102 and presentation apparatus 106 may be configured to provide memory layouts 120-122, visualizations 124-126, and/or metrics 128-130 for software programs developed using a variety of programming languages and/or software development kits (SDKs).

Figure 2:
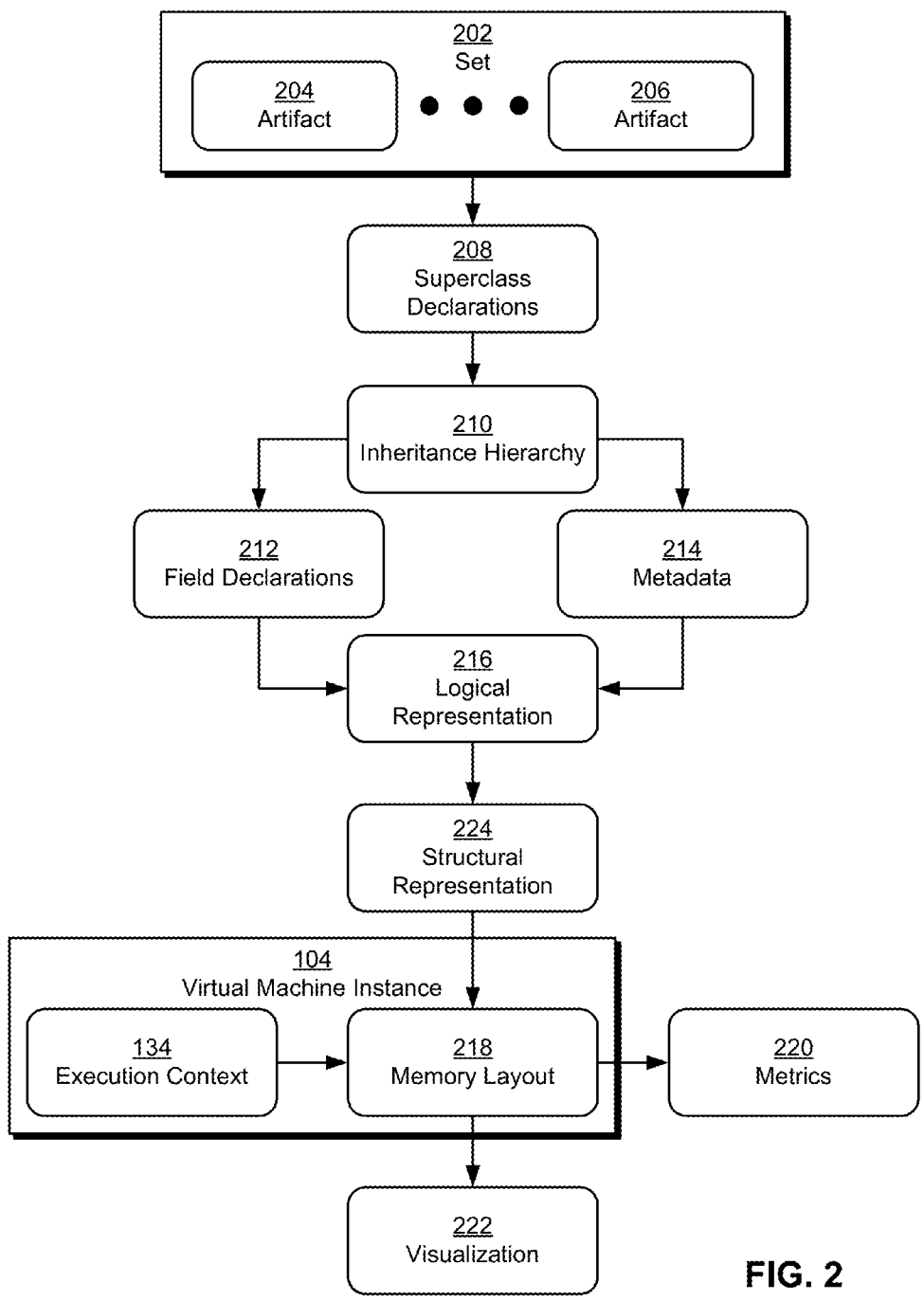
FIG. 2 shows the generation of a memory layout of an object instance in a software program in accordance with the disclosed embodiments.

FIG. 2 shows the generation of a memory layout 218 of an object instance in a software program (e.g., software program 110 of FIG. 1) in accordance with the disclosed embodiments. As shown in FIG. 2, memory layout 218 may be created from a set 202 of artifacts 204-206 associated with executing the software program. Artifacts 204-206 may include compiled classes and/or other binary or executable forms of the software program. Alternatively, artifacts 204-206 may be obtained from a memory dump of the software program, structured descriptions of classes in the software program, and/or other representations of the classes.

Set 202 may be obtained as a directory, library, package, and/or other collection or aggregation of artifacts 204-206. For example, set 202 may include all the compiled classes required to execute the software program, or set 202 may include artifacts 204-206 that are used to implement or execute an individual component or module of the software program.

More specifically, set 202 may include an artifact that represents the object instance. To create memory layout 218 for the object instance, a set of superclass declarations 208 may be obtained from artifacts 204-206 and used to identify an inheritance hierarchy 210 associated with the artifact. For example, one or more artifacts 204-206 may have a superclass declaration that specifies a superclass of the artifact. As a result, a chain of superclass declarations from the artifact to the topmost superclass of the inheritance hierarchy may be used to identify the classes that make up different levels of inheritance hierarchy 210. If a superclass declaration in the chain cannot be resolved to a particular artifact in set 202 (e.g., because the artifact is not in set 202), building of memory layout 218 may fail.

Next, inheritance hierarchy 210 may be used to obtain a set of field declarations 212 and metadata 214 from the artifact and additional artifacts in inheritance hierarchy 210. Field declarations 212 may include named values and types of fields in the artifacts. For example, field declarations 212 may include variable declarations, which specify the names and types of variables used by the artifacts. Metadata 214 may be related to the layout of the object instance in memory. For example, metadata 214 for a Java™ object may include the @Contended annotation, which adds padding before and after a field to isolate the field in memory.

Field declarations 212 and metadata 214 are then used to create a logical representation 216 of the object instance. As described above, logical representation 216 may include the order in which the fields were declared in field declarations 212, the levels of inheritance hierarchy 210 to which the fields belong, and/or one or more arrays included in the fields. Logical representation 216 may also include metadata 214 and/or other attributes that may affect the placement of the fields in memory layout 218, such as a hierarchy of Java™ Contention groups associated with the fields.

Logical representation 216 may be converted into a structural representation 224 of the object instance, such as a standardized binary version of the object instance that can be used to size the fields and/or components of the object instance. A virtual machine instance 104 may then apply execution context 134 to structural representation 224 to generate memory layout 218. As mentioned above, virtual machine instance 104 may be configured to operate within execution context 134. For example, virtual machine instance 104 may be instantiated as a remote process using a platform (e.g., platform version), architecture (e.g., hardware architecture), and/or one or more configuration options (compression options, padding options, layout options, etc.). If a change to execution context 134 is made, a new virtual machine instance may be instantiated using the change, and virtual machine instance 104 may be terminated.

Once structural representation 224 is provided to virtual machine instance 104, virtual machine instance 104 may generate memory layout 218 by determining the allocated sizes and offsets of fields and/or other components in structural representation 224. In addition, memory layout 218 may be affected by execution context 134. For example, virtual machine instance 104 may generate a more efficient memory layout 218 with a 64-bit architecture in execution context 134 than with a 32-bit architecture in execution context 134, because the larger word size of the 64-bit architecture may allow for encoding and/or other optimizations that improve the memory usage of the object instance.

In one or more embodiments, memory layout 218 includes a set of components in the object instance, as computed by virtual machine instance 104. For example, memory layout 218 may include a header component occupying the first word of memory layout 218, followed by a metadata component that references metadata for the class and/or entity represented by the object instance. Memory layout 218 may also include a number of additional components, such as an array component describing the length of an array, a contention padding component specifying padding caused by the Java™ @Contended annotation, and/or an external padding component specifying padding at the end of memory layout 218 (e.g., due to data alignment requirements associated with execution context 134). The components may further include a field component specifying the layout of a field in the object instance, a split field component indicating that a field is longer than the word size (e.g., a double or long in 32-bit architecture), and/or an internal padding component specifying padding inserted within memory layout 218.

Memory layout 218 may also include the names, types, offsets, and allocated sizes of the components, as well as the levels of inheritance hierarchy 210 to which the components belong. For example, memory layout 218 may specify a field element with a name of "myinteger," a type of "int," an offset of 12, and a size of 4. Memory layout 218 may also indicate that the field element belongs to (e.g., is owned by) a class in inheritance hierarchy 210 that is two levels above the object instance (e.g., the superclass of the superclass of the object instance).

Once memory layout 218 is created, a visualization 222 of memory layout 218 may be provided. Visualization 222 may include components in memory layout 218 as overlays on a grid. As described in further detail below with respect to FIGS. 4A-4D, visualization 222 may distinguish between data and padding in memory layout 218, as well as fields associated with different levels of inheritance hierarchy in memory layout 218.

A set of metrics 220 associated with memory layout 218 may additionally be determined and provided along with visualization 222. For example, metrics 220 may include the allocated sizes and offsets of components in memory layout 218, the overall memory usage of the object instance, the amount of padding in the object instance, and/or the number of references to the object instance (e.g., as an estimate of the number of times the object instance recurs in the software program). Metrics 220 may be displayed within the same GUI as visualization 222, as described below with respect to FIGS. 4A-4D. Finally, metrics 220 may include a potential memory savings associated with refactoring of the object instance, the calculation of which is described below with respect to FIG. 3.

Figure 3:
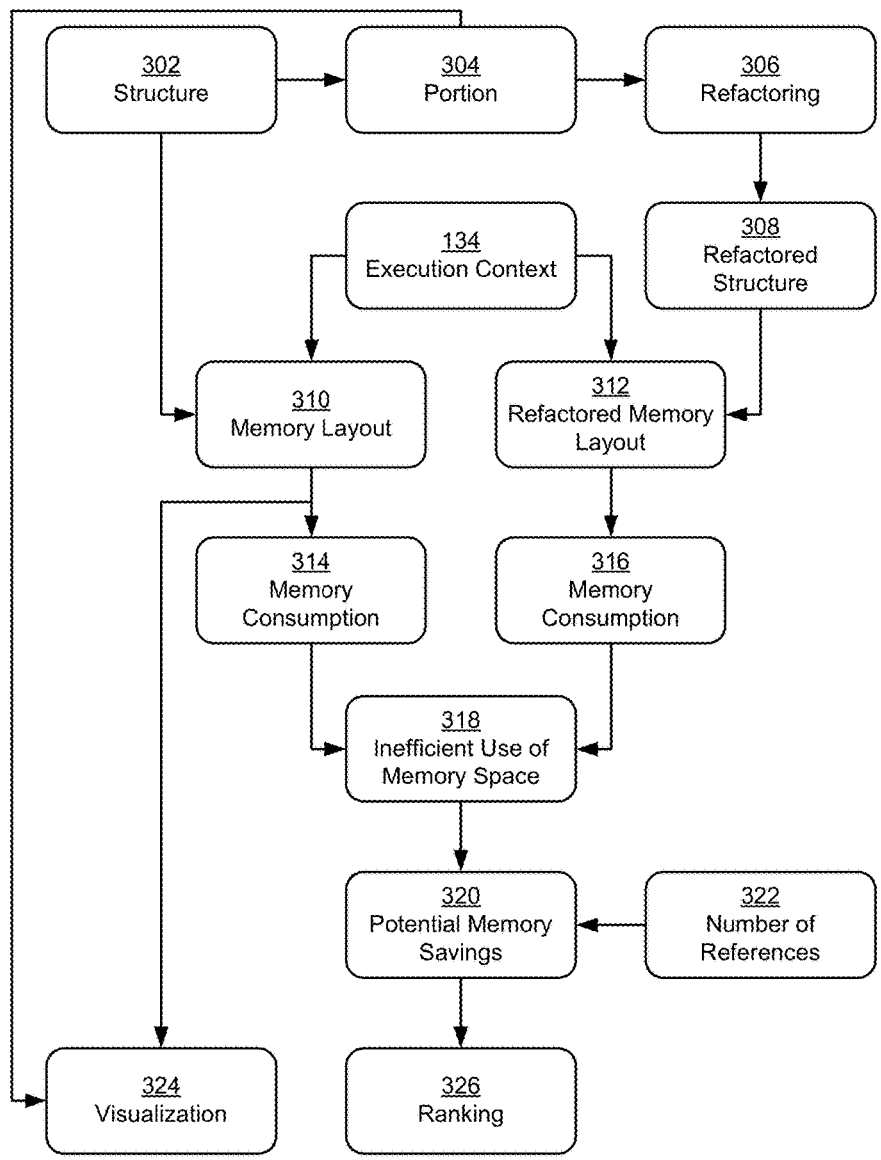
FIG. 3 shows the identification of an improvement to the memory usage of a software program in accordance with the disclosed embodiments.

FIG. 3 shows the identification of an improvement to the memory usage of a software program in accordance with the disclosed embodiments. More specifically, FIG. 3 shows the identification of an improvement in the memory usage of an object instance in the software program based on a refactoring 306 of the object instance. First, a structure 302 of the object instance is obtained. As discussed above, structure 302 may include information that can be used to generate a memory layout 310 of the object instance based on execution context 134. For example, structure 302 may be described in a structural (e.g., binary) representation of the object instance, which is created from a logical representation of the object instance.

Next, structure 302 may be analyzed to identify a portion 304 of the object instance that may be associated with inefficient use of memory space 318 in the software program. Such inefficient use of memory space may be caused by the use of data structures or types that can be replaced by other data structures or types that achieve the same behavior with a smaller memory footprint. For example, structure 302 may be analyzed to identify patterns that may lead to inefficient use of memory in the object instance. Such patterns may include, but are not limited to, a large number of Booleans in the object instance that can be replaced by a bit set that consumes less memory, a large number of levels in the inheritance hierarchy of the object instance that results in padding in between fields of different levels of the inheritance hierarchy, and/or use of boxed primitives that occupy more memory than simple primitives. Portions that match the patterns, including portion 304, may be flagged for subsequent analysis.

In the subsequent analysis, a refactoring 306 of the object instance may be used to generate a refactored structure 308 of the object instance. Refactoring 306 may include a variation of portion 304 that does not include a pattern associated with inefficient use of memory space 318. For example, refactoring 306 may replace a set of Booleans in portion 304 with a bit set that consumes less memory, reduce the number of levels in the inheritance hierarchy associated with fields in portion 304, reorder fields in portion 304, and/or replace boxed primitives in portion 304 with simple primitives. In turn, structure 308 may include a structure that reflects refactoring 306 of portion 304 in the object instance.

Memory layout 310 may be generated from structure 302 and execution context 134, and a refactored memory layout 312 may be generated from refactored structure 308 and the same execution context 134. Memory consumptions 314-316 of memory layout 310 and refactored memory layout 312 may also be calculated by, for example, adding the allocated sizes of all components in each memory layout, including padding components. Memory consumption 314 of memory layout 310 may then be compared with memory consumption 316 of refactored memory layout 312 to determine if inefficient use of memory space 318 is present in the object instance. For example, the object instance may be determined to inefficiently use memory space if memory consumption 316 is lower than memory consumption 314.

Once inefficient use of memory space 318 in the object instance is established, a potential memory savings 320 associated with refactoring 306 is calculated. For example, potential memory savings 320 may be calculated as the difference in memory consumption 314-316 between memory layout 310 and refactored memory layout 312. Potential memory savings 320 may also be calculated based on a number of references 322 to the object instance in the software program. For example, the difference in memory consumption 314-316 may be multiplied by number of references 322 to obtain an overall potential memory savings 320 associated with refactoring 306 of the object instance across the software program.

To enable improved memory usage in the software program, refactoring 306 may be provided to the user in a user interface such as a GUI and/or CLI. Similarly, a visualization 324 of memory layout 310 may be displayed within the same user interface, and portion 304 may be distinguished from other components in memory layout 310 in visualization 324, as discussed in further detail below with respect to FIG. 4B. Finally, the object instance may be included in a ranking 326 of object instances in the software program by potential memory savings 320. For example, potential memory savings 320 may be calculated for all object instances that are determined to inefficiently use memory space, and the object instances may be included in ranking 326 by descending order of potential memory savings 320 to facilitate larger reductions in the memory consumption of the software program, as discussed below with respect to FIG. 4D.

Figure 4A:
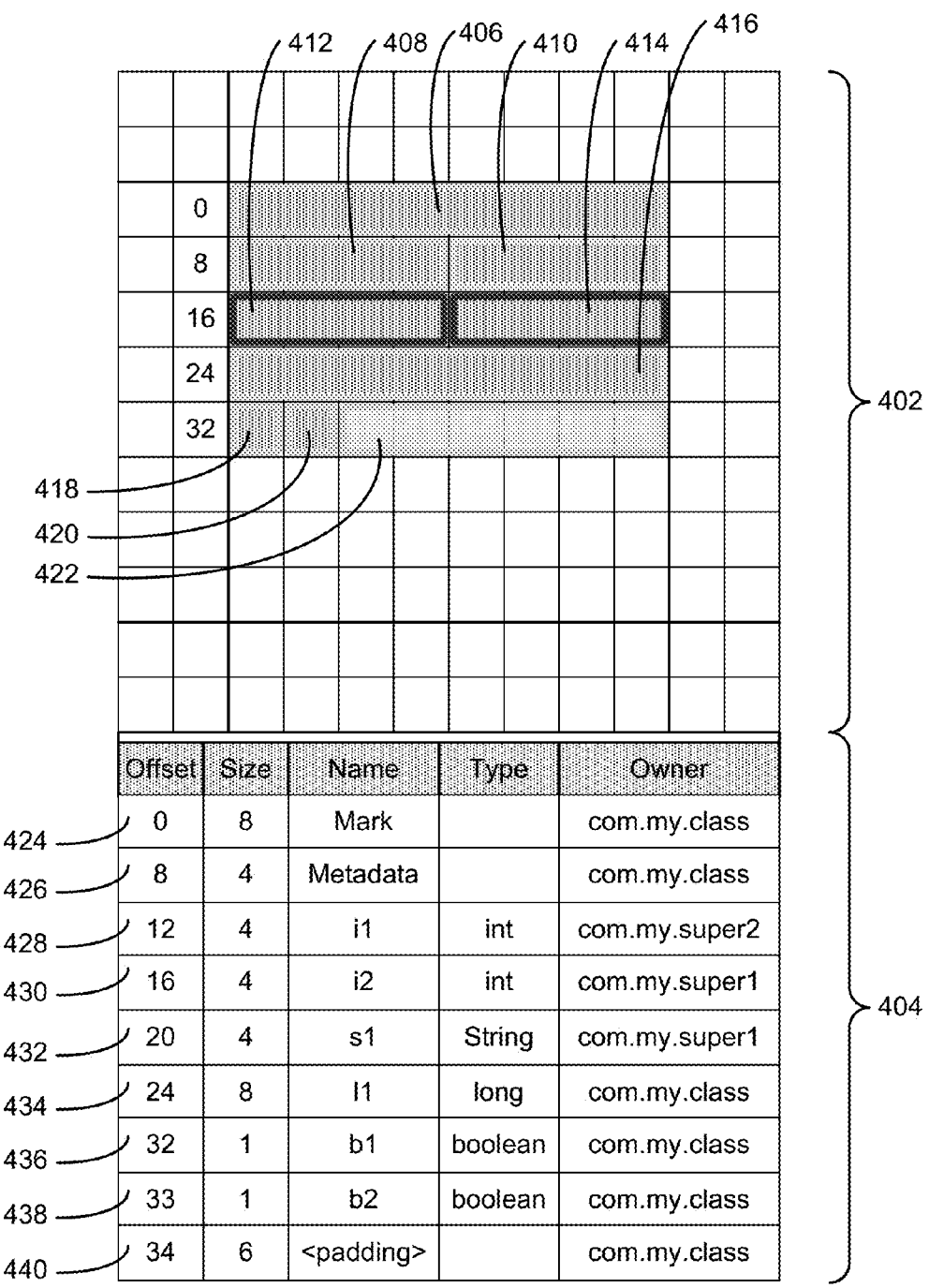
FIG. 4A shows an exemplary screenshot in accordance with the disclosed embodiments.

FIG. 4A shows an exemplary screenshot in accordance with the disclosed embodiments. More specifically, FIG. 4A shows a screenshot of a user interface provided by a presentation apparatus, such as presentation apparatus 106 of FIG. 1. For example, the presentation apparatus may form part of a tool that is used to view, manage, and/or improve the memory consumption of a software program, such as software program 110 of FIG. 1

As shown in FIG. 4A, the user interface includes a visualization 402 of a memory layout of an object instance in the software program. Visualization 402 may include a grid of rectangles and a set of components 406-422 overlaid on the grid. Each rectangle in the grid may represent a unit of memory, such as one byte. In addition, each row of visualization 402 may be labeled with a memory offset; the first row may start at offset 0, the second row may start at offset 8, the third row may start at offset 16, the fourth row may start at offset 24, and the fifth row may start at offset 32.

Components 406-422 may be positioned in the grid based on the offsets and allocated sizes of components 406-422, which may be obtained from the memory layout of the object instance. For example, the memory layout may specify a first component 406 with an offset of 0 and a size of 8, a second component 408 with an offset of 8 and a size of 4, a third component 410 with an offset of 12 and a size of 4, a fourth component 412 with an offset of 16 and a size of 4, and a fifth component 414 with an offset of 20 and a size of 4. The memory layout may also include a sixth component 416 with an offset of 24 and a size of 8, a seventh component 418 with an offset of 32 and a size of 1, an eighth component 420 with an offset of 33 and a size of 1, and a ninth component 422 with an offset of 34 and a size of 6.

Characteristics of components 406-422 from the memory layout may also be reflected in the appearance of components 406-422 in visualization 402. First, the borders of components 406-408 and 416-422 may be shown in a first color (e.g., beige), the borders of components 412-414 may be shown in a second color (e.g., purple), and the border of component 410 may be shown in a third color (e.g., green). Such color-coding of components 406-422 may represent ownership of components 406-422 by different levels of the object instance's inheritance hierarchy. For example, the first (e.g., beige) color may indicate ownership of components 406-408 and 416-422 by the base class from which the object instance is created, the second (e.g., purple) color may indicate ownership of components 412-414 by a superclass of the base class, and the third (e.g., green) color may represent ownership of component 410 by a superclass of the superclass.

Second, components 406-420 may be opaque, while component 422 may be semi-transparent. The difference in transparency between components 406-420 and component 422 may be used to distinguish between data in the object instance and padding in the object instance. For example, the opacity of components 406-420 may indicate that components 406-420 represent fields and/or other data in the object instance, while the semi-transparency of component 422 may indicate that component 422 is padding in the object instance's memory layout.

The user interface of FIG. 4A also includes a table 404 of information related to components 406-422 in visualization 402. Each row 424-440 in table 404 may include data for a given component 406-422 in visualization 402. For example, table 404 may provide offsets, allocated sizes, names, types, and/or owners of components 406-422. Row 424 may describe an offset of 0, a size of 8, a name of "Mark" (e.g., mark word), and an owner of "com.my.class" for component 406. Row 426 may specify an offset of 8, a size of 4, a name of "Metadata" (e.g., class metadata), and the same owner of "com.my.class" for component 408. Components 406-408 may be owned by the "com.my.class" class (e.g., the base class from which the object instance is created) because components 406-408 would not be present if the base class did not exist.

Row 428 may include an offset of 12, a size of 4, a name of "i1," a type of "int," and an owner of "com.my.super2" for component 410. Row 428 may indicate that the component 410 belongs to a different class (e.g., a super-superclass) than the base class from which the object instance is created, which is reflected in the green coloring of component 410 in visualization 402.

Row 430 may provide an offset of 16, a size of 4, a name of "i2," a type of "int," and an owner of "com.my.super1" for component 412. Row 432 may include an offset of 20, a size of 4, a name of "s1," a type of "String," and an owner of "com.my.super1" for component 414. Rows 430-432 may indicate that components 412-414 belong to a different class than the classes that own components 406-410 (e.g., a superclass of the base class), which is reflected in the purple coloring of components 412-414 in visualization 402.

Row 434 may specify an offset of 24, a size of 8, a name of "l1," a type of "long," and an owner of "com.my.class" for component 416. Row 436 may include an offset of 32, a size of 1, a name of "b1," a type of "boolean," and an owner of "com.my.class" for component 418. Row 438 may include an offset of 33, a size of 1, a name of "b2," a type of "boolean," and an owner of "com.my.class" for component 420. Rows 434-438 may indicate that components 416-420 are owned by the same class as components 406-408, which is shown in the beige coloring of components 406-408 and 416-420.

Finally, row 440 may specify an offset of 34, a size of 6, a name of "<padding>," and an owner of "com.my.class" for component 422. Row 440 may indicate that component 422 is padding that is appended to the end of the object instance to meet data alignment requirements associated with the layout of object instances in memory. Component 422 is given the same owner as components 418-420 because component 422 would not exist if components 418-420 were not located in their respective positions in the object instance's memory layout.

Figure 4B:
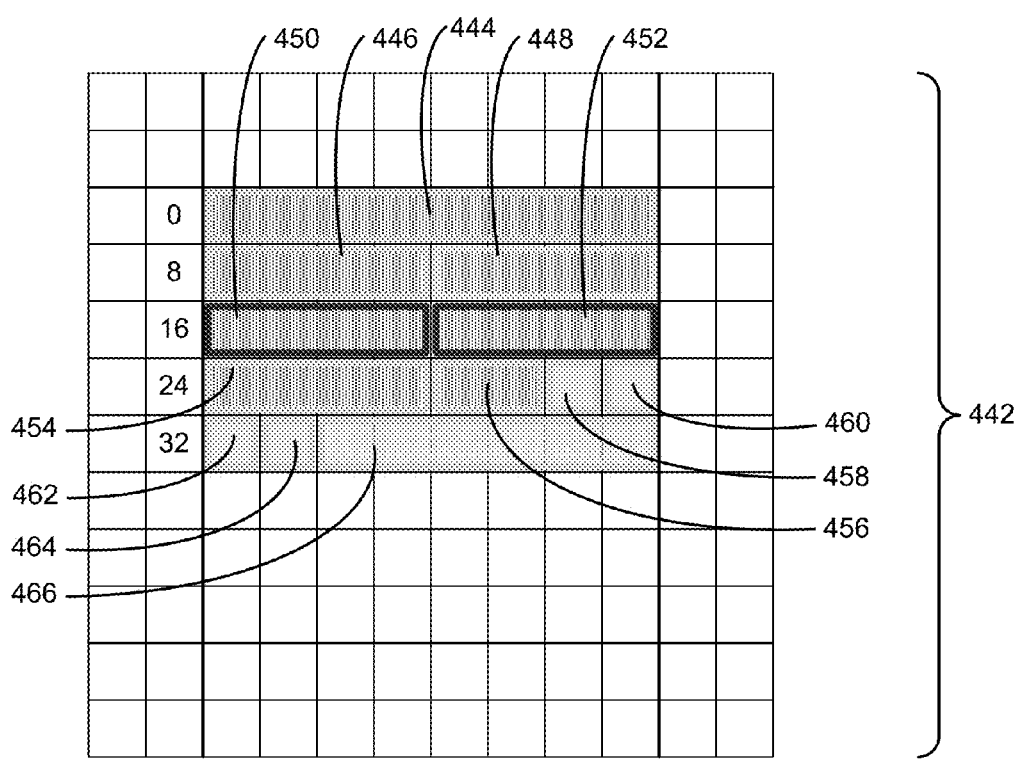
FIG. 4B shows an exemplary screenshot in accordance with the disclosed embodiments.

FIG. 4B shows an exemplary screenshot in accordance with the disclosed embodiments. Like the screenshot of FIG. 4A, FIG. 4B shows a screenshot of a user interface provided by a presentation apparatus, such as presentation apparatus 106 of FIG. 1.

The user interface of FIG. 4B also includes a visualization 442 of a memory layout of an object instance. Within visualization 442, a number of components 444-466 in the object instance are overlaid on rectangles of a grid. Rows of the grid may represent memory offsets of 0 to 40. Component 444 may have an offset of 0 and a size of 8, component 446 may have an offset of 8 and a size of 4, component 448 may have an offset of 12 and a size of 4, component 450 may have an offset of 16 and a size of 4, and component 452 may have an offset of 20 and a size of 4. Component 454 may have an offset of 24 and a size of 4, component 456 may have an offset of 28 and a size of 2, and components 458-464 may all have a size of 1 and offsets of 30, 31, 32, and 33, respectively. Finally, component 466 may have an offset of 34 and a size of 6.

Components 444-466 may also have distinct coloring, transparency, and/or other graphical distinctions. For example, the borders of components 444-466 may be colored beige, purple, or green to indicate ownership of components 444-466 by a base class, a superclass of the base class, and/or a superclass of the superclass. Similarly, component 466 may be more transparent than components 444-464 to indicate that component 466 represents padding in the object instance and components 444-464 represent data in the object instance.

Moreover, the center of components 458-464 may be colored yellow, while the center of other components 444-456 and 466 may be colored gray. The yellow coloring of components 458-464 may identify a portion of the object instance that is determined to inefficiently use memory space in the software program. For example, components 458-464 may represent four Boolean fields that cause a padding component 466 to be included in the memory layout. By flagging components 458-464 in visualization 442, the user interface may allow a user (e.g., a developer of the software program) to refactor the corresponding fields and reduce the memory usage of the software program. For example, the user may use visualization 442 to identify the four Boolean fields represented by components 458-464 and refactor the fields into a bit set that fits into the $31^{st}$ byte of the memory layout, thus reducing the overall memory consumption of the object instance by 8 bytes. Visualization 442 may also be accompanied by a suggestion for refactoring the object instance, as described below with respect to FIG. 4D.

FIG. 4C shows an exemplary screenshot in accordance with the disclosed embodiments. As with the screenshots of FIGS. 4A-4B, FIG. 4C shows a screenshot of a user interface provided by a presentation apparatus, such as presentation apparatus 106 of FIG. 1. In particular, the user interface of FIG. 4C includes a table 468 of data related to memory consumption of object instances in a software program. Table 468 may be shown next to a visualization of a memory layout of an object instance in the software program, or table 468 may be shown on a separate screen of the user interface.

Each row 470-482 in table 468 may include a size, a padding size, and a class name of an object instance in the software program. Row 470 has a size of 376, a padding size of 257, and a class name of "com.my.bigclass." Row 472 has a size of 80, a padding size of 10, and a class name of "com.my.bigclass2." Row 474 has a size of 72, a padding size of 7, and a class name of "com.my.super2." Row 476 has a size of 56, a padding size of 8, and a class name of "com.my.super1." Row 478 has a size of 48, a padding size of 4, and a class name of "com.my.class3." Row 480 has a size of 48, a padding size of 6, and a class name of "com.my.class2." Row 482 has a size of 40, a padding of 6, and a class name of "com.my.class," which represents the class from which the object instance of FIG. 4A is created.

In addition, rows 470-482 may be sorted in decreasing order of size. Such sorting may allow a user to identify object instances that use large amounts of memory in the software program. The user may select a header (e.g., "Size," "Padding," "Class") in table 468 to sort data in rows 470-482 by the attribute represented by the header. For example, the user may click on the "Padding" header to sort data in rows 470-482 by decreasing order of padding size to identify object instances with the most padding (e.g., wasted memory) in the software program. Alternatively, the user may click on the "Class" header to sort data in rows 470-482 by alphabetical order of class name to locate an object instance with a given class name in table 468.

FIG. 4D shows an exemplary screenshot in accordance with the disclosed embodiments. As with the screenshots of FIGS. 4A-4C, FIG. 4D shows a screenshot of a user interface provided by a presentation apparatus, such as presentation apparatus 106 of FIG. 1. The user interface of FIG. 4D includes a table 484 of data related to memory consumption of object instances in a software program. As with table 468 of FIG. 4C, table 484 may be shown next to a visualization of a memory layout of an object instance in the software program or on a different screen of the user interface.

Unlike table 468, each row 486-492 of table 484 may include a potential gain (e.g., potential memory savings) associated with refactoring of an object instance in the software program, followed by the class name of the object instance. Row 486 has a potential gain of 24 and a class name of "com.my.class4," row 488 has a potential gain of 16 and a class name of "com.my.class2," row 490 has a potential gain of 8 and a class name of "com.my.class," and row 492 has a potential gain of 8 and a class name of "com.my.class3."

The user interface also includes a label 494 (e.g., "Classes that could benefit from boolean refactoring") that identifies the type of refactoring to be performed to obtain the memory gains in table 484. For example, label 494 may indicate that the object instances associated with rows 486-492 may be refactored by converting Boolean fields in the object instances into bit sets that occupy less memory. In turn, the refactoring of each object instance may eliminate padding at the end of the object instance's memory layout, thus providing a potential memory savings of a multiple of 8. Differences in the potential memory savings of the object instances may be due to the number and/or positions of Boolean fields to be refactored in each object instance. Alternatively, the potential memory savings shown in table 484 may be based on the number of references to a given object instance. For example, a potential memory savings of 16 for an object instance may be based on a refactoring of the object instance that reduces the memory consumption of the object instance by 16 bytes or a refactoring that reduces memory consumption by 8 bytes multiplied by two references to the object instance in the software program.

Figure 5:
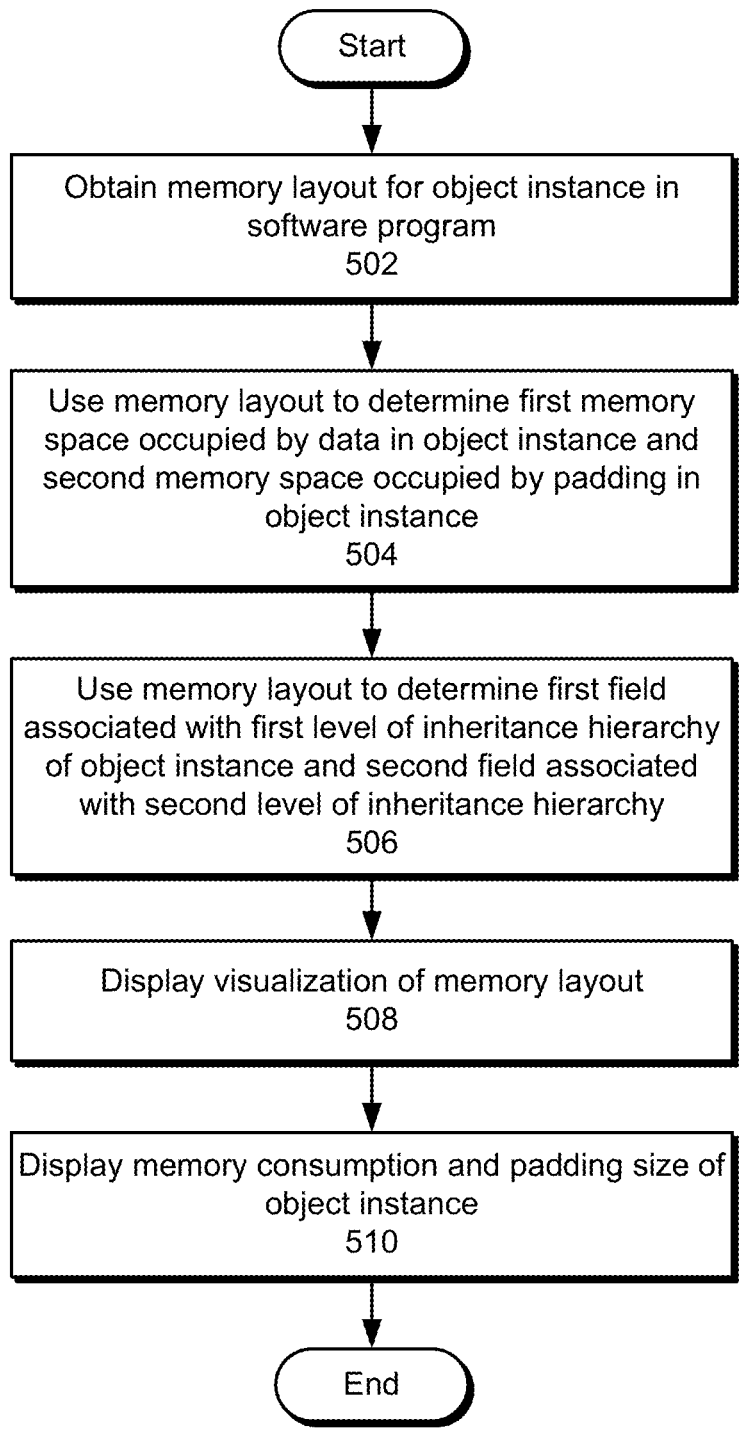
FIG. 5 shows a flowchart illustrating the process of facilitating the execution of a software program in accordance with the disclosed embodiments.

FIG. 5 shows a flowchart illustrating the process of facilitating the execution of a software program in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

Initially, a memory layout for an object instance in the software program is obtained (operation 502). The memory layout may include a set of offsets and a set of allocated sizes of a set of components associated with the object instance. The memory layout may be generated based on a structure and an execution context for the software program, as described below with respect to FIG. 6. The memory layout may be generated using a logical representation of the object instance and a virtual machine instance, as described below with respect to FIG. 7. The memory layout may further be generated from a set of artifacts associated with executing the software program, as described in further detail below with respect to FIGS. 8-9.

Next, the memory layout is used to determine a first memory space occupied by data in the object instance and a second memory space occupied by padding in the object instance (operation 504). For example, the memory layout may be examined to obtain the offsets and allocated sizes of one or more fields in the object instance, as well as the offsets and allocated sizes of one or more padding components in the object instance.

Similarly, the memory layout is used to determine a first field associated with a first level of an inheritance hierarchy of the object instance and a second field associated with a second level of the inheritance hierarchy (operation 506). For example, the memory layout may specify the owner (e.g., base class, superclass, super-superclass, etc.) of each field in the object instance, which may allow the level of the inheritance hierarchy associated with the field to be determined.

A visualization of the memory layout is then displayed (operation 508). The visualization may include a graphical distinction between the first and second memory spaces, as well as a different graphical distinction between the first and second fields. For example, the graphical distinctions may include differences in the color, transparency, shading, texture, shape, and/or other visual attributes of components in the visualization. The visualization may thus facilitate user understanding of the layout and ordering of components in the object instance, as well as identification of components associated with memory waste (e.g., padding) in the object instance.

A memory consumption and padding size of the object instance is also displayed (operation 510). For example, the memory consumption and/or padding size may be included in a list of object instances that is ordered by decreasing memory consumption and/or padding size. As a result, the memory consumption and/or padding size may allow a user to compare the memory usage and/or waste of the object instance with those of other object instances in the software program.

Figure 6:
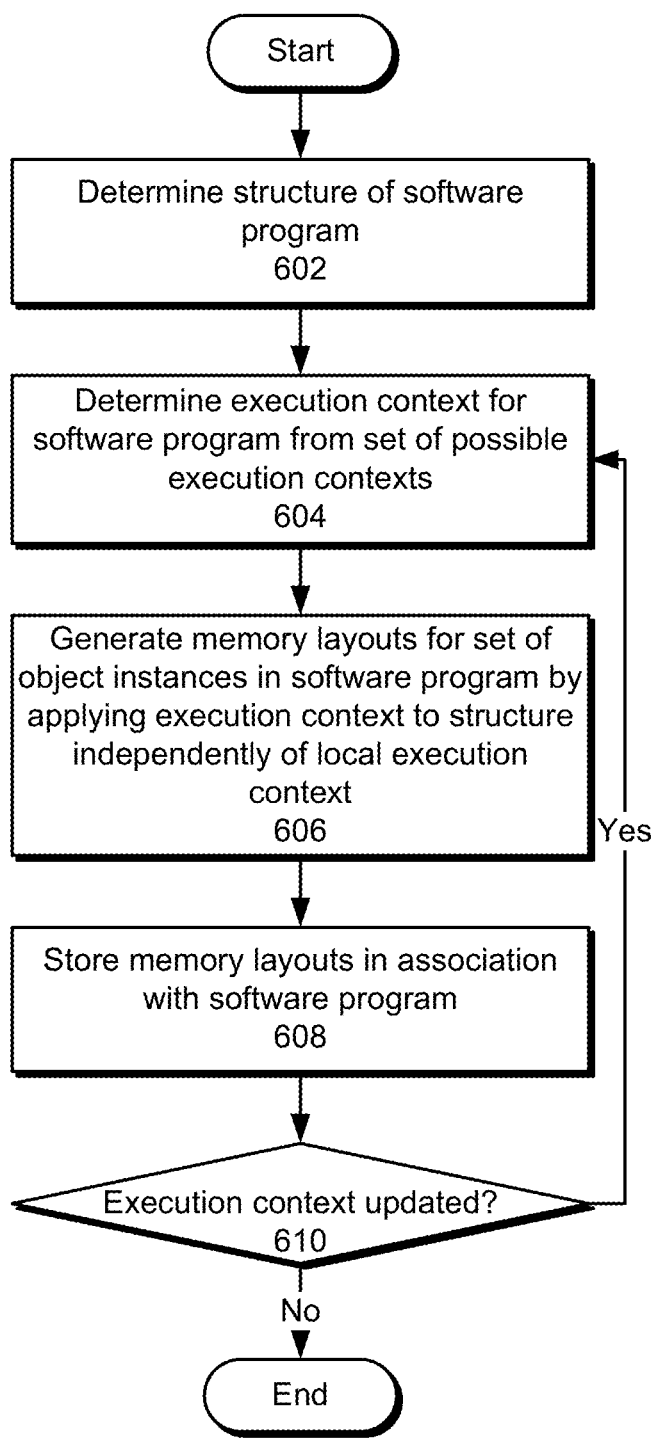
FIG. 6 shows a flowchart illustrating the process of facilitating the execution of a software program in accordance with the disclosed embodiments.

FIG. 6 shows a flowchart illustrating the process of facilitating the execution of a software program in accordance with the disclosed embodiments. In one or more embodiments, one or more of the steps may be omitted, repeated, and/or performed in a different order. Accordingly, the specific arrangement of steps shown in FIG. 6 should not be construed as limiting the scope of the embodiments.

First, the structure of the software program is determined (operation 602). The structure of the software program may include information that can be used to generate memory layouts of object instances in the software program, as described in further detail below with respect to FIG. 7. An execution context for the software program is also determined from a set of possible execution contexts (operation 604). For example, the execution context may be obtained from a local execution context, a memory dump of the software program, and/or user input.

Memory layouts for a set of object instances in the software program are generated by applying the execution context to the structure independently of a local execution context (operation 606) of a computer system used to generate the memory layouts. For example, the memory layouts may be generated using a virtual machine instance that is configured to operate within the execution context, as discussed below with respect to FIG. 7.

The memory layouts are then stored in association with the software program (operation 608). For example, the memory layouts may be stored in a database and/or filesystem for subsequent retrieval and/or use in generating visualizations of the memory layouts.

The execution context may be updated (operation 610). For example, the execution context may be updated to enable the generation of memory layouts within different execution contexts. If the execution context is updated, the updated execution context is determined from the set of possible execution contexts (operation 604), and memory layouts for the object instances are generated and stored (operation 606-608) based on the updated execution context. Such context-based generation of memory layouts may continue until memory layouts have been generated and stored for all relevant execution contexts (e.g., a set of execution contexts across which the memory layouts are to be compared).

Figure 7:
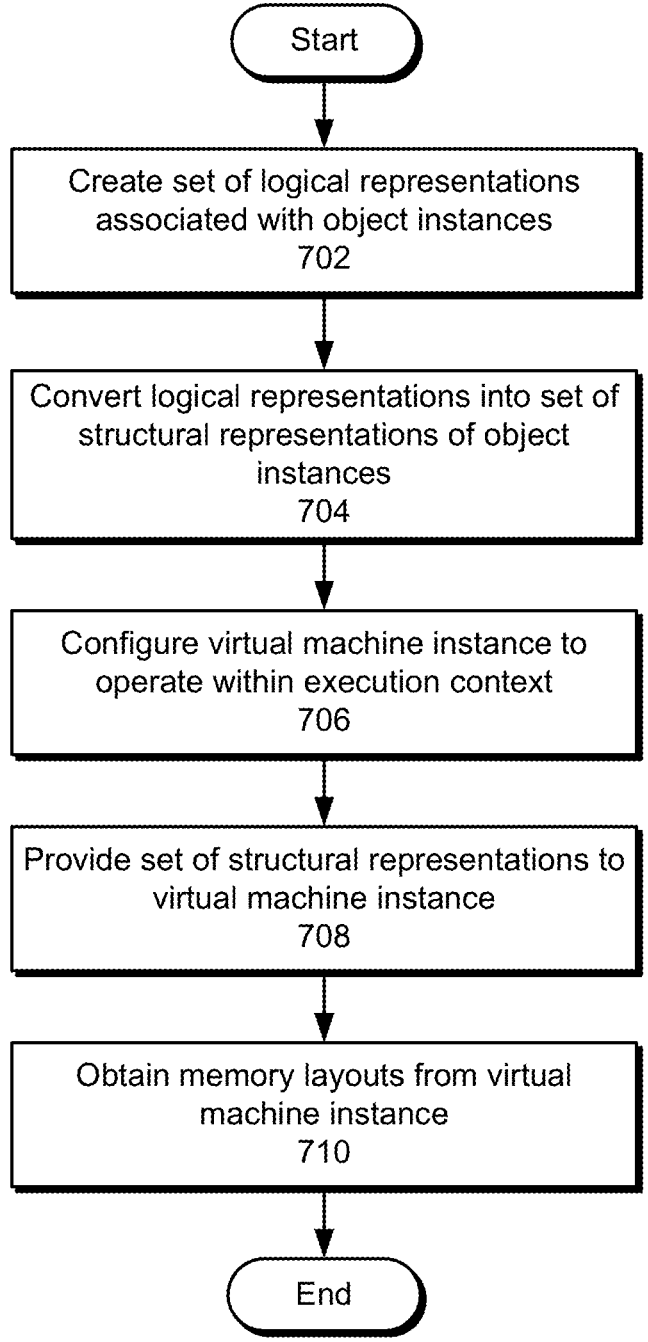
FIG. 7 shows a flowchart illustrating the process of generating memory layouts for a set of object instances in a software program in accordance with the disclosed embodiments.

FIG. 7 shows a flowchart illustrating the process of generating memory layouts for a set of object instances in a software program in accordance with the disclosed embodiments. In one or more embodiments, one or more of the steps may be omitted, repeated, and/or performed in a different order. Accordingly, the specific arrangement of steps shown in FIG. 7 should not be construed as limiting the scope of the embodiments.

Initially, a set of logical representations associated with the object instances is created (operation 702). Each logical representation may include a set of fields, a parent class, and/or metadata related to a layout of the fields. As a result, the logical representations may represent the structure of the software program. Creation of logical representations of object instances is described below with respect to FIG. 8.

Next, the logical representations are converted into a set of structural representations of the object instances (operation 704). For example, each logical representation may include a set of strings describing the fields, parent class, and/or metadata related to the layout of the fields in the corresponding object instance. Each component (e.g., field, parent class, metadata) listed in the logical representation may be converted into a binary version of the same component (e.g., instance field, parent structural representation, contention group hierarchy, etc.) in the corresponding structural representation.

Next, a virtual machine instance is configured to operate within an execution context (operation 706). For example, the virtual machine instance may be instantiated to operate with a given platform, architecture, and/or set of configuration options, as provided by a user, local execution context, and/or memory dump of the software program. If the execution context is the local execution context, a local virtual machine instance may be used. If the execution context differs from the local execution context, a remote virtual machine instance may be instantiated to operate within the execution context. If the execution context is updated, a new virtual machine instance may be instantiated to operate within the updated execution context, and any previously executing virtual machine instances may be terminated.

The set of structural representations is then provided to the virtual machine instance (operation 708) and used by the virtual machine instance to generate the memory layouts. The memory layouts are then obtained from the virtual machine instance (operation 710). For example, a communication protocol may be used to transmit the logical representations to a remote virtual machine instance and receive memory layouts from the virtual machine instance.

Figure 8:
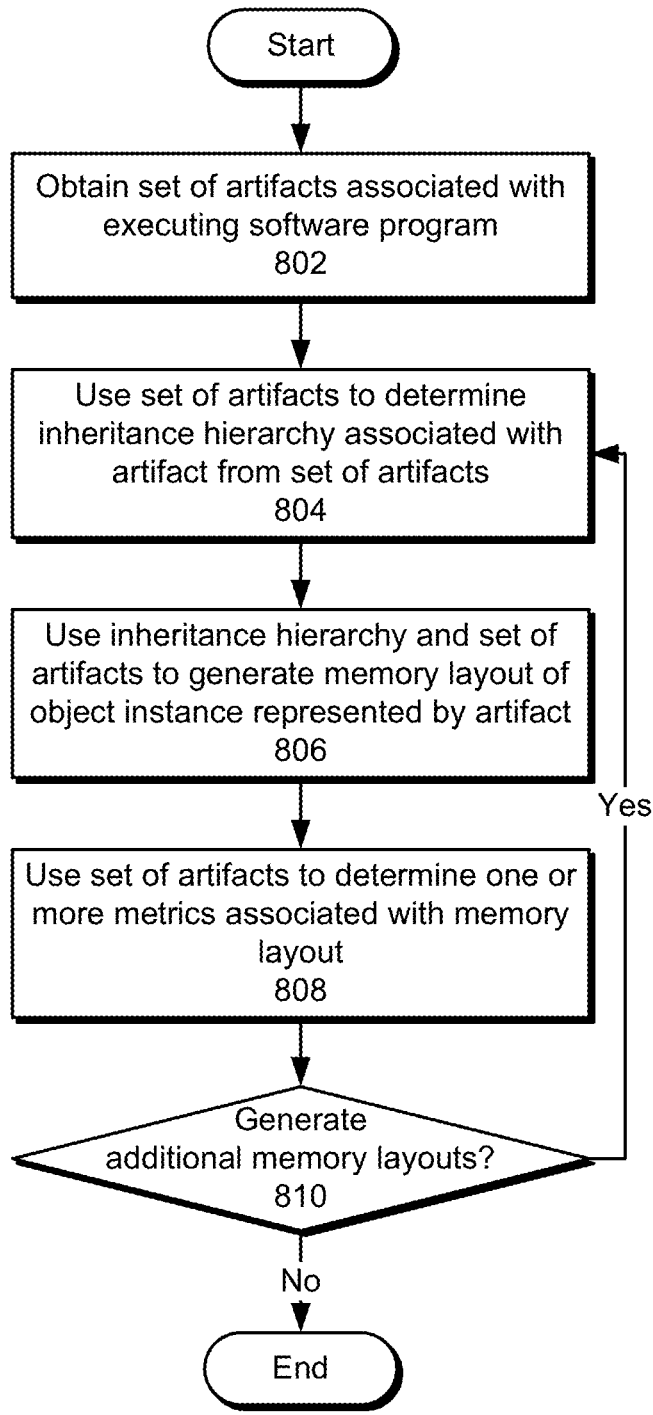
FIG. 8 shows a flowchart illustrating the process of generating memory layouts for object instances in a software program in accordance with the disclosed embodiments.

FIG. 8 shows a flowchart illustrating the process of generating memory layouts for object instances in a software program in accordance with the disclosed embodiments. In one or more embodiments, one or more of the steps may be omitted, repeated, and/or performed in a different order.

Accordingly, the specific arrangement of steps shown in FIG. 8 should not be construed as limiting the scope of the embodiments.

First, a set of artifacts associated with executing the software program is obtained (operation 802). The set of artifacts may include compiled classes and/or other structured representations of classes. The artifacts may be obtained as a package, directory, and/or other aggregation or collection. For example, a user may specify one or more packages and/or directories containing the set of artifacts.

Next, the set of artifacts is used to determine an inheritance hierarchy associated with an artifact from the set (operation 804). The inheritance hierarchy of the artifact may be identified from superclass declarations in the artifact and one or more additional artifacts associated with the inheritance hierarchy. For example, the inheritance hierarchy may be determined by following a chain of superclass declarations from the artifact to one or more additional artifacts until the top of the inheritance hierarchy is reached.

Once the inheritance hierarchy is determined, the inheritance hierarchy and set of artifacts are used to generate a memory layout of an object instance represented by the artifact (operation 806). To generate the memory layout, a logical representation of the object instance is created, as described below with respect to FIG. 9. The logical representation may then be provided to a virtual machine instance, and the memory layout may be obtained from the virtual machine instance, as discussed above.

The set of artifacts may also be used to determine one or more metrics associated with the memory layout (operation 808). For example, the set of artifacts may be examined to determine the number of references to the object instance, the overall memory usage associated with the object instance, and/or a potential memory savings associated with the object instance. Calculation and use of potential memory savings associated with object instances is described below with respect to FIGS. 10-11.

Additional memory layouts may be generated (operation 810) from the set of artifacts. For example, memory layouts may be generated for some or all of the artifacts in the set. If additional memory layouts are to be generated, the set of artifacts is used to determine the inheritance hierarchy associated with an artifact (operation 804) representing an object instance for which a memory layout is to be generated, and the inheritance hierarchy and set of artifacts are used to generate the memory layout of the object instance (operation 806). One or more metrics associated with the memory layout may also be determined (operation 808). Generation of memory layouts from the set of artifacts (operation 810) may thus continue until all memory layouts and/or related metrics have been generated from the set of artifacts.

Figure 9:
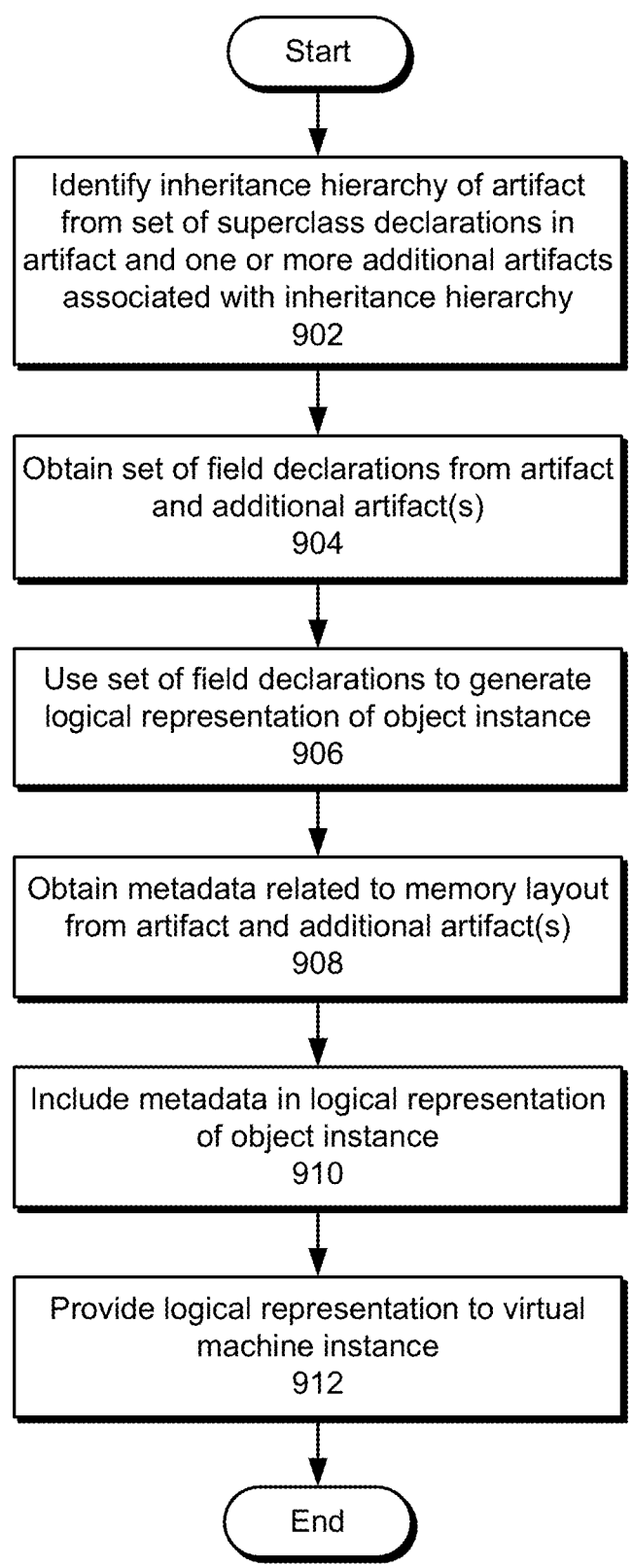
FIG. 9 shows a flowchart illustrating the process of using a set of artifacts to generate a memory layout of an object instance represented by an artifact from the set of artifacts in accordance with the disclosed embodiments.

FIG. 9 shows a flowchart illustrating the process of using a set of artifacts to generate a memory layout of an object instance represented by an artifact from the set of artifacts in accordance with the disclosed embodiments. In one or more embodiments, one or more of the steps may be omitted, repeated, and/or performed in a different order. Accordingly, the specific arrangement of steps shown in FIG. 9 should not be construed as limiting the scope of the embodiments.

First, the inheritance hierarchy of an artifact is identified from a set of superclass declarations in the artifact and one or more additional artifacts associated with the inheritance hierarchy (operation 902). As mentioned above, the inheritance hierarchy may be determined by following a chain of superclass declarations from the artifact to one or more additional artifacts until the top of the inheritance hierarchy is reached.

Next, a set of field declarations is obtained from the artifact and additional artifact(s) (operation 904) and used to generate a logical representation of the object instance (operation 906). For example, the field declarations and/or artifacts may be used to add the names, types, and/or owners of the fields to the logical representation. Similarly, metadata related to the memory layout is obtained from the artifact and additional artifact(s) (operation 908) and included in the logical representation of the object instance (operation 910). For example, metadata related to the Java™ @Contended annotation may be obtained from the artifacts and added to the logical representation to facilitate accurate generation of a memory layout from the logical representation.

Finally, the logical representation is provided to a virtual machine instance (operation 912), and the logical representation is used by the virtual machine instance to generate the memory layout. For example, the virtual machine instance may convert the logical representation into a structural representation of the object instance, and the same virtual machine or a different virtual machine may generate the memory layout from the structural representation.

Figure 10:
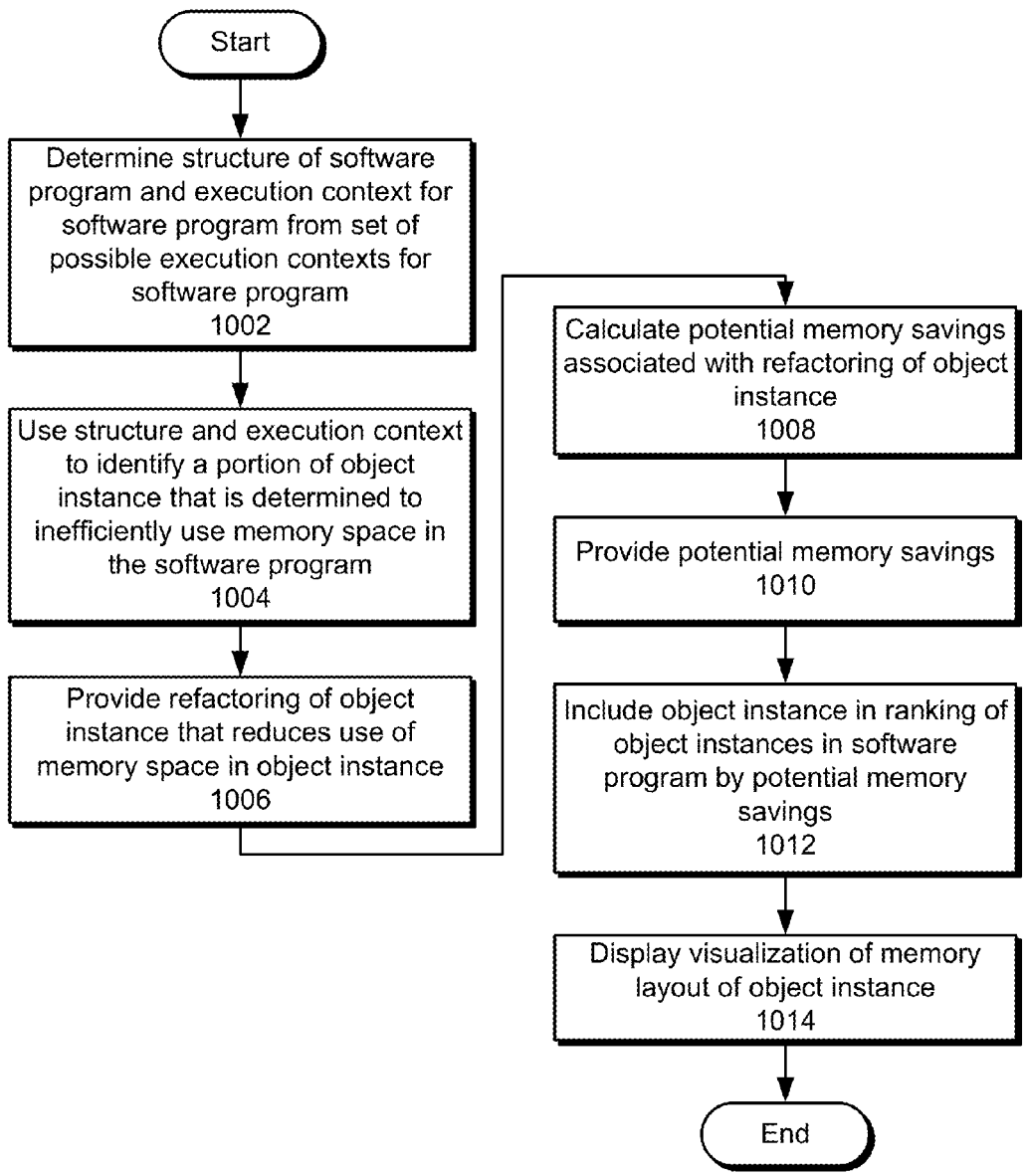
FIG. 10 shows a flowchart illustrating the process of improving memory usage in a software program in accordance with the disclosed embodiments.

FIG. 10 shows a flowchart illustrating the process of improving memory usage in a software program in accordance with the disclosed embodiments. In one or more embodiments, one or more of the steps may be omitted, repeated, and/or performed in a different order. Accordingly, the specific arrangement of steps shown in FIG. 10 should not be construed as limiting the scope of the embodiments.

First, a structure of a software program is determined, along with an execution context for the software program from a set of possible execution contexts (operation 1002). The software program may include one or more object instances created from one or more classes. Next, the structure and execution context are used to identify a portion of an object instance in the software program that is determined to inefficiently use memory space in the software program (operation 1004), as described below with respect to FIG. 11.

A refactoring of the object instance that reduces use of the memory space in the object instance is then provided (operation 1006) to improve the memory usage of the software program. For example, the refactoring may be displayed as a suggestion within a user interface of a tool for improving the memory usage of the software program. A potential memory savings associated with refactoring of the object instance is also calculated (operation 1008) and provided (operation 1010). For example, the potential memory savings may be displayed within the same user interface as the refactoring.

The object instance is further included in a ranking of object instances in the software program by potential memory savings (operation 1012). For example, the object instance may be displayed in a list of object instances that is sorted in descending order of potential memory savings. Finally, a visualization of the memory layout of the object instance is displayed (operation 1014). The visualization may include a graphical distinction between the portion that inefficiently uses the memory space and the remainder of the memory space. For example, the graphical distinction may flag one or more fields in the memory layout that cause the memory layout to add extra padding in the memory space.

Figure 11:
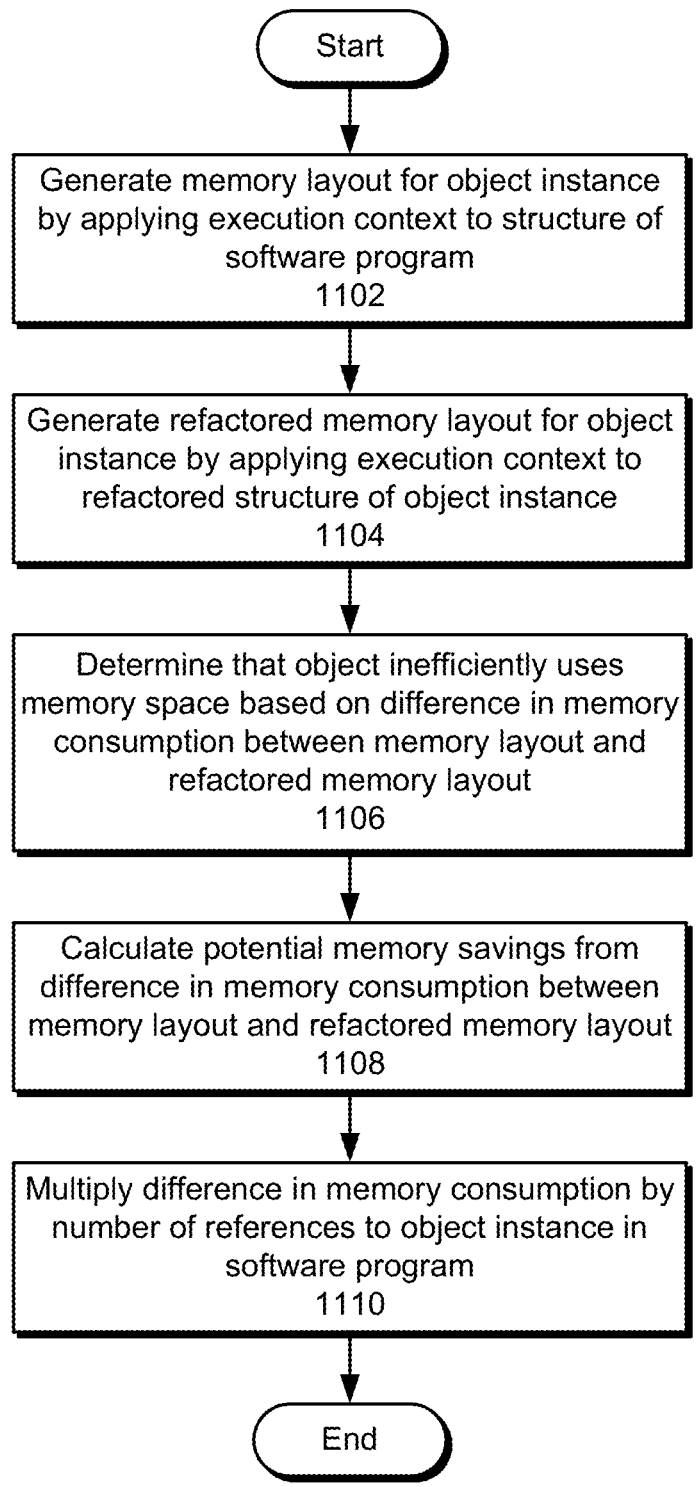
FIG. 11 shows a flowchart illustrating the process of identifying inefficient use of memory space in an object instance in a software program in accordance with the disclosed embodiments.

FIG. 11 shows a flowchart illustrating the process of identifying inefficient use of memory space in an object instance in a software program in accordance with the disclosed embodiments. In one or more embodiments, one or more of the steps may be omitted, repeated, and/or performed in a different order. Accordingly, the specific arrangement of steps shown in FIG. 11 should not be construed as limiting the scope of the embodiments.

Initially, a memory layout for the object instance is generated by applying an execution context for the software program to a structure of the software program (operation 1102), as described above. A refactored memory layout for the object instance is also generated by applying the execution context to a refactored structure of the object instance (operation 1104). The refactored structure may replace a portion of the object instance that matches a pattern associated with inefficient use of memory space with a refactoring that is not known to inefficiently use memory space. For example, the refactored structure may have a bit set in place of multiple Boolean fields in the original object instance, simple primitives in lieu of boxed primitives in the original object instance, and/or a reordering or reassigning of fields from the original object instance.

Next, the object is determined to inefficiently use the memory space based on the difference in memory consumption between the memory layout and the refactored memory layout (operation 1106). For example, the object may be determined to inefficiently use the memory space if the memory consumption of the refactored memory layout is lower than the memory consumption of the memory layout.

A potential memory savings is then calculated from the difference in memory consumption between the memory layout and the refactored memory layout (operation 1108). For example, the potential memory savings may be calculated by subtracting the memory consumption of the refactored memory layout from the memory consumption of the memory layout. The potential memory savings may further be calculated by multiplying the difference in memory consumption by the number of references to the object instance in the software program (operation 1110). The potential memory savings may thus reflect the number of times the object instance recurs in the software program, resulting in a higher potential memory savings the more times the object instance recurs in the software program.

Figure 12:
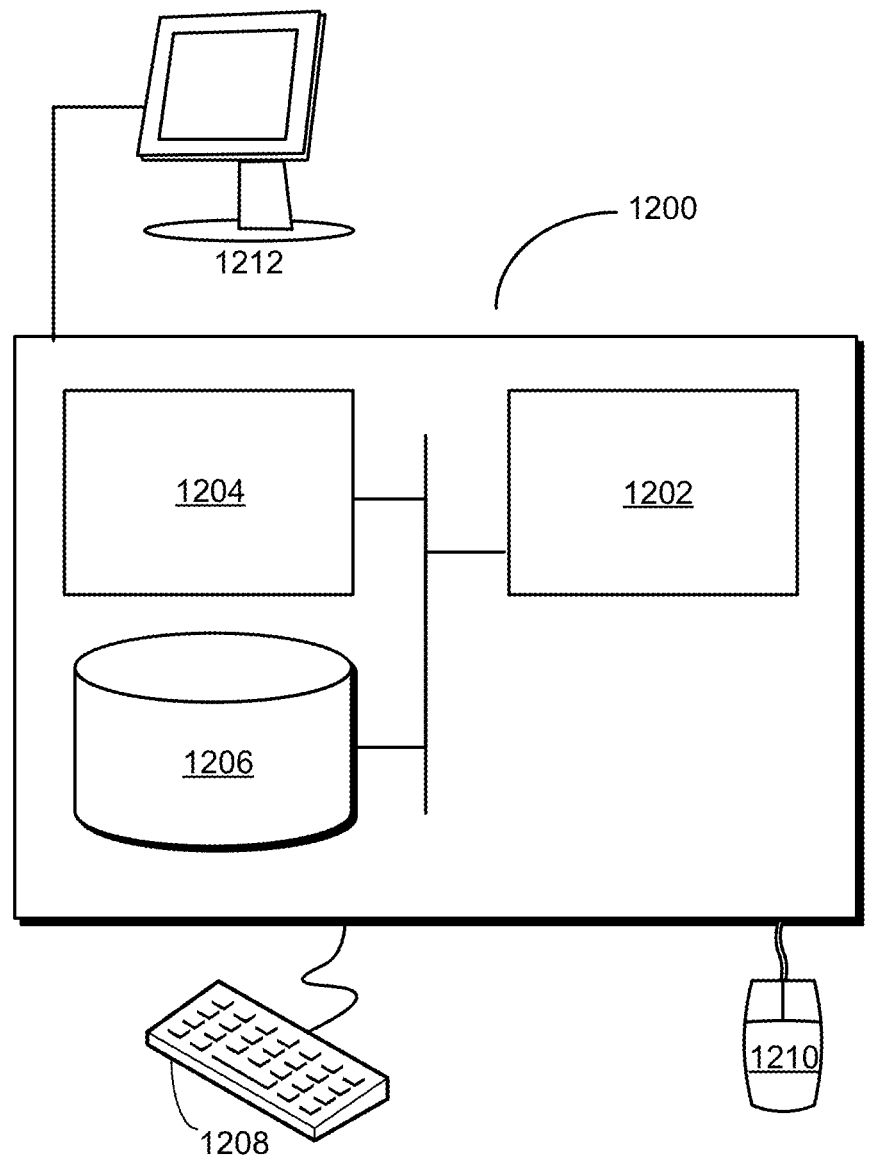
FIG. 12 shows a computer system in accordance with the disclosed embodiments.

FIG. 12 shows a computer system 1200 in accordance with an embodiment. Computer system 1200 may correspond to an apparatus that includes a processor 1202, memory 1204, storage 1206, and/or other components found in electronic computing devices such as personal computers, laptop computers, workstations, servers, mobile phones, tablet computers, and/or portable media players. Processor 1202 may support parallel processing and/or multi-threaded operation with other processors in computer system 1200. Computer system 1200 may also include input/output (I/O) devices such as a keyboard 1208, a mouse 1210, and a display 1212.

Computer system 1200 may include functionality to execute various components of the present embodiments. In particular, computer system 1200 may include an operating system (not shown) that coordinates the use of hardware and software resources on computer system 1200, as well as one or more applications that perform specialized tasks for the user. To perform tasks for the user, applications may obtain the use of hardware resources on computer system 1200 from the operating system, as well as interact with the user through a hardware and/or software framework provided by the operating system.

In one or more embodiments, computer system 1200 provides a system for facilitating the execution of a software program. The system may include an analysis apparatus that determines a structure of the software program and an execution context for the software program from a set of possible execution contexts for the software program. Next, the analysis apparatus may generate memory layouts for a set of object instances in the software program by applying the execution context to the structure independently of a local execution context on computer system 1200. The analysis apparatus may use a set of artifacts associated with executing the software program and/or a set of logical representations of the object instances to generate the memory layouts and/or determine one or more metrics associated with each memory layout.

The system may also include a presentation apparatus that obtains the memory layouts and displays visualizations of the memory layouts (e.g., within a GUI). Each visualization may include graphical distinctions between data in the corresponding object instance and padding in the object instance, fields associated with different levels of an inheritance hierarchy of the object instance, and/or a portion of the object instance that is determined to inefficiently use memory space and a remainder of the memory space. The presentation apparatus may also display a memory consumption and padding size of the object instance and/or a ranking of object instances in the software program by potential memory savings.

In addition, one or more components of computer system 1200 may be remotely located and connected to the other components over a network. Portions of the present embodiments (e.g., analysis apparatus, virtual machine instance, presentation apparatus, etc.) may also be located on different nodes of a distributed system that implements the embodiments. For example, the present embodiments may be implemented using a cloud computing system that improves the knowledge and management of memory consumption in a set of remote software programs.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
    obtaining, at a computer system, a set of artifacts associated with executing a software program;
    using the set of artifacts to determine, by the computer system, an inheritance hierarchy associated with an artifact from the set of artifacts, wherein said determining comprises identifying the inheritance hierarchy from a set of superclass declarations in the artifact and one or more additional artifacts associated with the inheritance hierarchy from the set of artifacts; and
    using the inheritance hierarchy and the set of artifacts to generate a memory layout of an object instance represented by the artifact, wherein the memory layout comprises a set of fields associated with a set of levels of the inheritance hierarchy, and wherein the memory layout indicates space occupied by padding in the object instance and space occupied by data in the object instance, wherein said generating the memory layout comprises:
        obtaining a set of field declarations from the artifact and the one or more additional artifacts;
        using the set of field declarations to generate a logical representation of the object instance, wherein the logical representation includes attributes that affect placement of the set of fields in the memory layout and padding in the memory layout; and converting the logical representation into a structural representation using a given execution context, wherein the structural representation is a physical representation of the object instance and wherein the given execution context represents configuration options for executing the software program within a given virtual machine;

providing the structural representation to the given virtual machine instance in the given execution context, wherein the structural representation is used by the given virtual machine instance to generate the memory layout;

identifying a portion of the object instance that inefficiently uses memory space by identifying use of patterns that lead to inefficient use of memory in the object instance;

comparing the memory layout of the object instance in the given execution context to a refactored memory layout of the object instance to verify that the portion of the object instance uses memory space inefficiently, wherein the refactored memory layout of the object instance is generated by applying the given execution context to a refactored structural representation of the object instance; and replacing the portion of the object instance that is associated with inefficient use of memory space with another portion from the refactored structural representation of the object instance that is not associated with inefficient use of memory space.

2. The method of claim 1, further comprising:
using the set of artifacts to determine, by the computer system, additional inheritance hierarchies associated with one or more additional artifacts from the set of artifacts; and
using the additional inheritance hierarchies and the set of artifacts to generate additional memory layouts of one or more object instances represented by the one or more additional artifacts.

3. The method of claim 1, further comprising:
using the set of artifacts to determine, by the computer system, one or more metrics associated with the memory layout.

4. The method of claim 3, wherein the one or more metrics comprise:
a potential memory savings associated with a refactoring of the object instance.

5. The method of claim 3, wherein the one or more metrics comprises a number of references to the object instance.

6. The method of claim 3, wherein the one or more metrics comprises an overall memory usage associated with the object instance.

7. The method of claim 1, wherein using the inheritance hierarchy and the set of artifacts to generate the memory layout of the object instance further comprises:
obtaining metadata related to the memory layout from the artifact and the one or more additional artifacts; and
including the metadata in the logical representation of the object instance.

8. The method of claim 1, wherein the set of artifacts comprises a compiled class.

9. The method of claim 1, wherein the set of artifacts is obtained as a package or a directory.

10. The method of claim 1, further comprising:
generating different memory layouts for additional logical representations; and identifying an inefficient memory layout from the different memory layouts.

11. The method of claim 1, wherein the memory layout is a given memory layout, the method further comprising:
providing the structural representation to the another virtual machine instance in another execution context, wherein the structural representation is used by the other virtual machine instance to generate another memory layout; and
comparing the given memory layout to the other memory layout to identify an impact on memory usage of the object instance from changing the execution context from the given execution context to the other execution context.

12. The method of claim 1, wherein a visualization of the memory layout is provided to the user to display the portion of the object instance that inefficiently uses memory space and the visualization provides a suggestion for refactoring for the object instance.

13. An apparatus, comprising:
one or more processors; and
memory storing instructions that, when executed by the one or more processors, cause the apparatus to:
obtain a set of artifacts associated with executing a software program;
use the set of artifacts to determine an inheritance hierarchy associated with an artifact from the set of artifacts, wherein said determining comprises identifying the inheritance hierarchy from a set of superclass declarations in the artifact and one or more additional artifacts associated with the inheritance hierarchy from the set of artifacts; and
use the inheritance hierarchy and the set of artifacts to generate a memory layout of an object instance represented by the artifact, wherein the memory layout comprises a set of fields associated with a set of levels of the inheritance hierarchy, and wherein the memory layout indicates space occupied by padding in the object instance and space occupied by data in the object instance, wherein said generating the memory layout comprises:
obtaining a set of field declarations from the artifact and the one or more additional artifacts;
using the set of field declarations to generate a logical representation of the object instance, wherein the logical representation includes attributes that affect placement of the set of fields in the memory layout and padding in the memory layout; and
converting the logical representation into a structural representation using a given execution context, wherein the structural representation is a physical representation of the object instance and wherein the given execution context represents configuration options for executing the software program within a given virtual machine;
providing the structural representation to the given virtual machine instance in the given execution context, wherein the structural representation is used by the given virtual machine instance to generate the memory layout;
identifying a portion of the object instance that inefficiently uses memory space by identifying use of patterns that lead to inefficient use of memory in the object instance;
comparing the memory layout of the object instance in the given execution context to a refactored memory layout of the object instance to verify that the portion of the object instance uses memory space inefficiently, wherein the refactored memory layout of the object instance is generated by applying the given execution context to a refactored structural representation of the object instance; and replacing the portion of the object instance that is associated with inefficient use of memory space with another portion from the refactored structural representation of the object instance that is not associated with inefficient use of memory space.

14. The apparatus of claim 13, wherein the memory further stores instructions that, when executed by the one or more processors, cause the apparatus to:

use the set of artifacts to determine additional inheritance hierarchies associated with one or more additional artifacts from the set of artifacts; and use the additional inheritance hierarchies and the set of artifacts to generate additional memory layouts of one or more object instances represented by the one or more additional artifacts.

15. The apparatus of claim 13, wherein the memory further stores instructions that, when executed by the one or more processors, cause the apparatus to:

use the set of artifacts to determine one or more metrics associated with the memory layout.

16. The apparatus of claim 15, wherein the one or more metrics comprise:

a potential memory savings associated with a refactoring of the object instance.

17. The apparatus of claim 15, wherein the one or more metrics comprises a number of references to the object instance.

18. The apparatus of claim 15, wherein the one or more metrics comprises an overall memory usage associated with the object instance.

19. The apparatus of claim 13, wherein using the inheritance hierarchy and the set of artifacts to generate the memory layout of the object instance further comprises:

obtaining metadata related to the memory layout from the artifact and the one or more additional artifacts; and including the metadata in the logical representation of the object instance.

20. A non-transitory computer-readable storage medium storing instructions that when executed by a computer cause the computer to perform a method, the method comprising:

obtaining a set of artifacts associated with executing a software program;

using the set of artifacts to determine an inheritance hierarchy associated with an artifact from the set of artifacts, wherein said determining comprises identifying the inheritance hierarchy from a set of superclass declarations in the artifact and one or more additional artifacts associated with the inheritance hierarchy from the set of artifacts; and using the inheritance hierarchy and the set of artifacts to generate a memory layout of an object instance represented by the artifact, wherein the memory layout comprises a set of fields associated with a set of levels of the inheritance hierarchy, and wherein the memory layout indicates space occupied by padding in the object instance and space occupied by data in the object instance, wherein said generating the memory layout comprises:

obtaining a set of field declarations from the artifact and the one or more additional artifacts;

using the set of field declarations to generate a logical representation of the object instance, wherein the logical representation includes attributes that affect placement of the set of fields in the memory layout and padding in the memory layout; and converting the logical representation into a structural representation using a given execution context, wherein the structural representation is a physical representation of the object instance and wherein the given execution context represents configuration options for executing the software program within a given virtual machine; and providing the structural representation to the given virtual machine instance in the given execution context, wherein the structural representation is used by the given virtual machine instance to generate the memory layout;

identifying a portion of the object instance that inefficiently uses memory space by identifying use of patterns that lead to inefficient use of memory in the object instance;

comparing the memory layout of the object instance in the given execution context to a refactored memory layout of the object instance to verify that the portion of the object instance uses memory space inefficiently, wherein the refactored memory layout of the object instance is generated by applying the given execution context to a refactored structural representation of the object instance; and replacing the portion of the object instance that is associated with inefficient use of memory space with another portion from the refactored structural representation of the object instance that is not associated with inefficient use of memory space.

21. The non-transitory computer-readable storage medium of claim 20, the method further comprising:

using the set of artifacts to determine one or more metrics associated with the memory layout.

22. The non-transitory computer-readable storage medium of claim 18, wherein the one or more metrics comprises a number of references to the object instance.

* * * * *

UNITED STATES PATENT AND TRADEMARK OFFICE
CERTIFICATE OF CORRECTION

PATENT NO. : 10,275,154 B2
APPLICATION NO. : 14/533966
DATED : April 30, 2019
INVENTOR(S) : Hunt et al.

Page 1 of 1

It is certified that error appears in the above-identified patent and that said Letters Patent is hereby corrected as shown below:

In the Specification

In Column 13, Line 13, delete "FIG. 1" and insert -- FIG. 1. --, therefor.

Signed and Sealed this
Twenty-eighth Day of July, 2020

Andrei Iancu
*Director of the United States Patent and Trademark Office*